(12) United States Patent
Sosonkina

(10) Patent No.: US 6,749,393 B2
(45) Date of Patent: Jun. 15, 2004

(54) WIND POWER PLANT

(76) Inventor: Yevgeniya Sosonkina, 1290 Pierce St., Birmingham, MI (US) 48009

( * ) Notice: Subject to any disclaimer, the term of this patent is extended or adjusted under 35 U.S.C. 154(b) by 139 days.

(21) Appl. No.: 09/928,710

(22) Filed: Aug. 13, 2001

(65) Prior Publication Data

US 2003/0035725 A1 Feb. 20, 2003

(51) Int. Cl.$^7$ ................................. F03D 3/02
(52) U.S. Cl. ................. 415/4.1; 415/4.2; 415/4.4; 415/14; 415/42; 415/45; 416/46; 416/117; 416/118
(58) Field of Search ............... 415/4.1, 4.2, 4.4, 415/2.1, 53.1, 53.3, 14, 36, 42, 44, 45, 126, 128, 151, 905, 907; 416/10, 11, 44, 47, 48, 110, 117, 118; 290/44, 55

(56) References Cited

U.S. PATENT DOCUMENTS

| | | | |
|---|---|---|---|
| 1,298,247 A | | 3/1919 | Muller |
| 1,687,181 A | | 10/1928 | Prease |
| 2,252,523 A | | 8/1941 | Plotkin |
| 3,150,821 A | * | 9/1964 | Laing ................. 415/53.1 |
| 4,093,398 A | | 6/1978 | Miller |
| 4,134,708 A | | 1/1979 | Brauser |
| 4,321,005 A | * | 3/1982 | Black ................. 415/4.2 |
| 4,606,697 A | * | 8/1986 | Appel ................. 415/4.4 |
| 4,857,753 A | * | 8/1989 | Mewburn-Crook et al. ... 290/55 |
| 4,930,985 A | | 6/1990 | Klute |
| 5,299,913 A | | 4/1994 | Heidelberg |
| 6,157,088 A | | 12/2000 | Bendix |

FOREIGN PATENT DOCUMENTS

| | | | | |
|---|---|---|---|---|
| DE | 4122667 A1 | * | 1/1993 | ............ 290/55 |
| FR | 2298015 A | * | 8/1976 | ............ 415/2.1 |
| SU | 1523709 A | * | 11/1989 | ............ 290/55 |
| WO | WO-92/16745 A1 | * | 10/1992 | ............ 415/4.2 |
| WO | WO 00/45050 | | 8/2000 | |

* cited by examiner

Primary Examiner—Christopher Verdier

(57) ABSTRACT

A wind power plant for producing electrical energy on a large scale, comprising a base, a housing, rotatable on said base around vertical axis. A wind tail, attached to the housing, rotate the housing toward direction of the wind, utilizing the power of the wind, and produces additional tunnel suction to the flow of the wind from front side to back side of the housing. A plurality of turbines, equipped with rotors with wide blades, is mounted inside the housing one above another. Deflectors cover from the wind the front side of the rotors above their axis of rotation while computer controlled governors are covering the remaining front side of the rotors below their axis of rotation, keeping steady the speed of rotation of the rotors. Working surfaces of turbines are covered from heavy snow and during the storm and protected from birds. Power plant saves the area of occupied land, utilizing higher speed of wind on higher elevations. It has an attractive aesthetic view and can be a landmark for the location where it is built.

14 Claims, 12 Drawing Sheets

WIND POWER PLANT

BRIEF DESCRIPTION OF PRIOR ART

Figure 1:
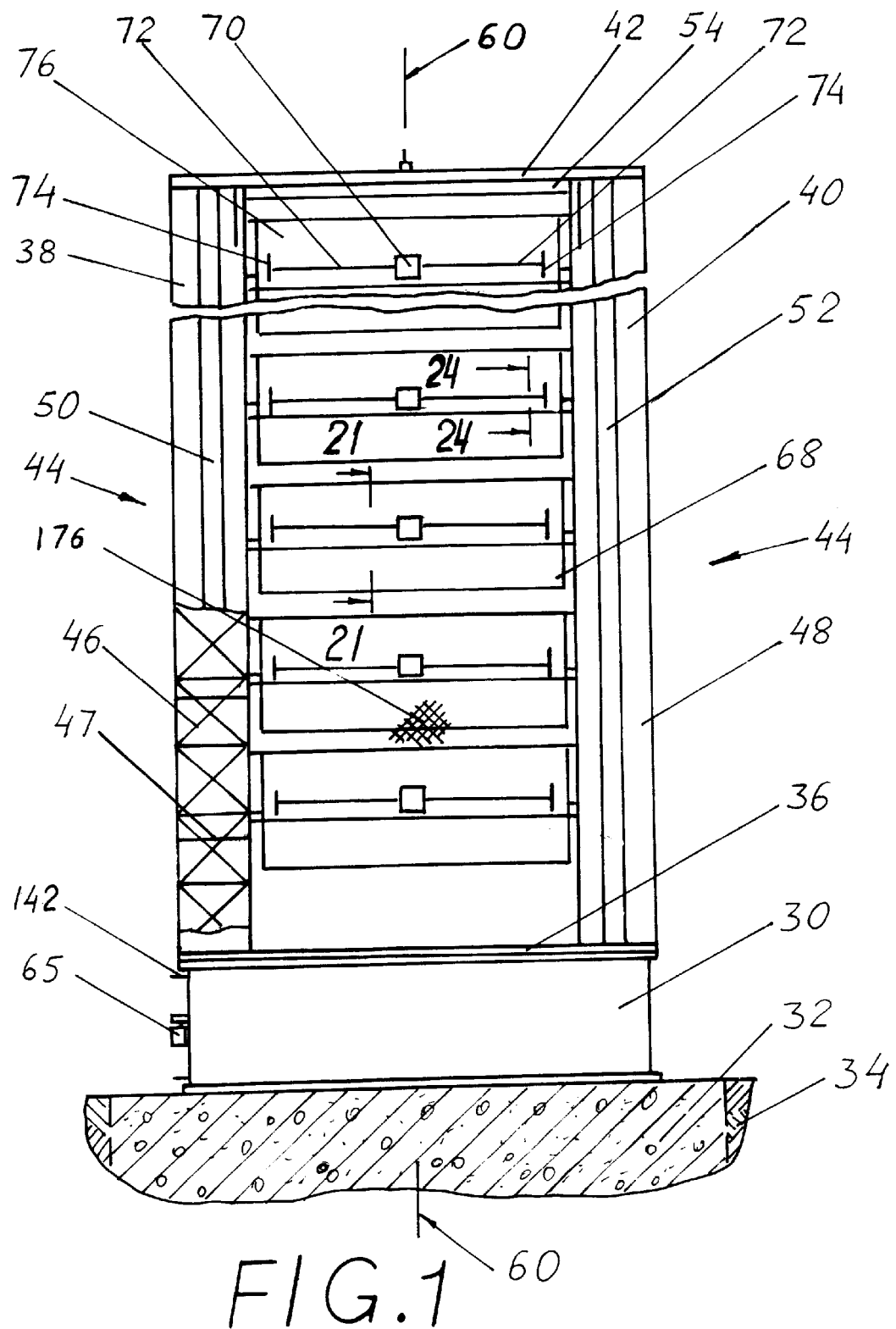

The use of wind power as a source of energy, especially windmills, has a long history tracing for hundreds of years. But these windmills were designed for fulfilling specific needs on specific sites and could not provide electrical energy for large grid of electrical power because they had too small scale and could not meet necessary standard for electrical power because of constant change of their speed of rotation and absence of means for controlling this speed. Propellers, used in most power plants, that we can see, for example, in California, cannot provide us with a solution. Even theoretically they cannot use all the energy of areas swept by propellers because they move in plane perpendicular to the direction of the wind. The surface of propeller should be curved to face the wind with proper angle, and it is difficult to build a wide propeller blade twisted at the hub. Also, we cannot build too long blades because it faces too big distractive centrifugal forces in cross section of their twisted blades near the hub. Since the energy of the wind corresponds to the surface of its cross section, narrow blade faces narrow strip of the wind and receives a small portion of energy of the wind that passes by. At the same time, big amount of small size plants consumes too much areas of the land. They don't have good aesthetic view, are bad for bird population and difficult for maintenance, especially in case of stormy weather or snow.

Wind power plant, proposed by Heidelberg, Fed. Rep. of Germany, U.S. Pat. No. ; 5,299,913, date of patent Apr. 5, 1994, includes a plurality of upright rotor blades, which could be more longer lasting than propeller blades. This plant also comprises energy conversion means for converting rotary motion into electrical energy. But this plant cannot have more than six narrow blades of special shape (see column 4, 10), so the output of energy, which depends of surface of the blades, disposed to the direction of the wind, cannot be big. This plant also doesn't have any control of the rotational speed, any safety measures and means for maintenance, especially, as it proposes to be located at the sea, and will be broken after the first storm, when the wind can be too erratic and very strong.

International publication number WO 00/45050, International publication date 3 Aug. 2000, applicant and inventor Israelsson Alf, Stockholm (SE), describes a wind power plant, which includes many narrow parallel arranged wind absorbing blades, suggesting that they will move with medium speed (see page 3a) on carriages. These carriages are connected one after the other in an oblong and closed track in a direction perpendicular to the direction of the wind. Each blade has its own electrical correcting unit that should correct the pitch angle regulation. But it is not clear, what and when will send signals to these units. And how the author of the invention knows, that the carriages with the blades will move with medium speed along the track. Sooner, the proposed conveyor with blades will move erratically, and sometimes stop completely, depending of the changing speed of the wind or direction of the wind. The friction between the wheels of the carriages and the tracks can be too high and will be changing with every change of the wind because part of the force of the wind, impacting on the blades, pushes the wheels perpendicular to tracks. And every change of the angle of the blades also will change the vertical force onto the wheels and the force of friction between the wheels and the tracks.

Erratic movement of the generators cannot produce standard electric power. In this invention author also did not mention which means will orient the plant toward the wind. Because of oblong structure of this plant, it will always try to turn it in the direction of the wind on its rotational base while it needs to be placed perpendicular to wind in order to work.

Figure 8:
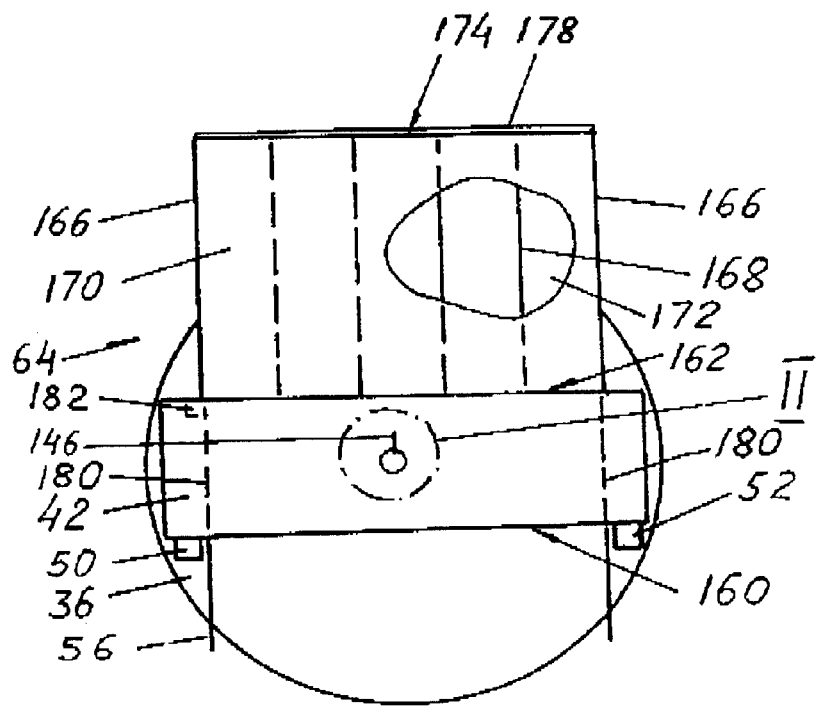
Figure 9:
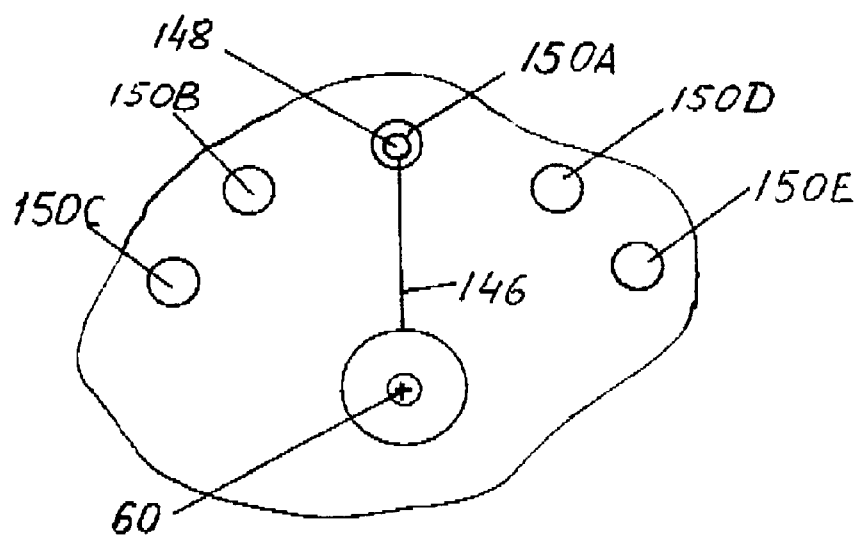
Figure 10:
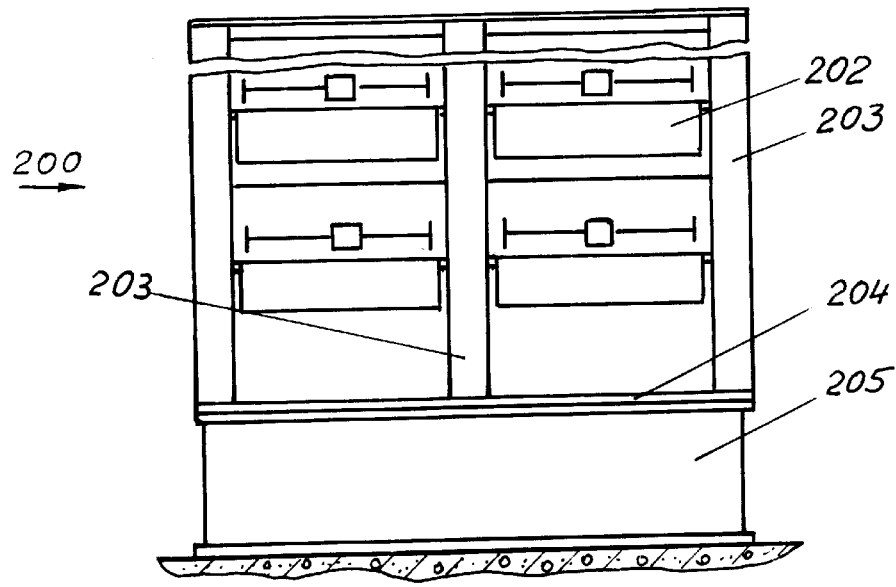

United States Patent for Dec. 5, 2000, U.S. Pat. No. 6,157,088, inventor Horst Bendix, Leipzig, Germany, shows a wind energy system for utilizing of a decommissioned power station or industrial chimney as a tower for a wind converter with high electrical output and propeller type turbines with horizontal axis of rotation of the rotor. FIG. 8, FIG. 9 and FIG. 10 show different arrangements of several converters on one tower with height of the 300 meters.

But this energy system does not have any rate control and does not have any means for preventing synchronous speed of the rotors. The system also uses propeller type rotors with narrow blades and cannot utilize all the energy of the area swept by these propellers. It does not have any prevention against storm, snow, can harm the bird population, does not have any safety measures for maintenance and overhaul.

United States Patent for March 1919, U.S. Pat. No. 1,298,247, inventor John Muller, shows a windmill, containing a wind wheel, a windshield, and a tail vane. This windmill does not have means for controlling the wheel speed. The shield should cover near 180 degrees of wheel surface and is too big for easy operating.

United States Patent for Oct. 9. 1928, U.S. Pat. No. 1,687,181, inventor Thomas B. Prease, shows a wind motor, comprising a supportive frame, a vertical shaft, a rotor, rotating on this shaft, having a plurality of disks, secured to this shaft, blades disposed between the disks and rigidly secured to the disks.

This windmill does not have any rate control. A shield is covering 180 degrees of the surface of the rotor and it will cause eddying of the air in the narrow passage between the blades and the shield despite the openings in the shield: if the openings are too small, they will provide a little help; if the openings are big, the shield will not be a shield.

The blades are secured to disks but have curved surfaces in horizontal and vertical directions and too complicated, heavy and expensive to be implemented on a large scale. A rotor having blades of such bended shape can rotate under impact of the wind even without shield, and we can see small turbines working as fans on the roofs of different buildings, having similar shape of blades.

U.S. Pat. No. 2,252,523, for Windmill, inventor Milton Plotkin, patented Aug. 12, 1941, describes a structure, comprising a frameworks, in which is rotatable mounted a revolving shield, partially enclosing a wing-equipped rotor, exposed at one side thereof to the force of the wind; the shield is being provided with fins, which cooperate to ensure the proper automatic positioning of the shield, relative to the direction of the wind.

The shield is slightly less than 180 degrees of a circumferential length and present a vertical leading and trailing edges. The size of the shield is too big but it cannot cover from the snow or very strong wind more than 180 degrees of the surface of the rotor from the left side of axis of rotation, if the wind will change the directions too quickly. At the same time, the air, exiting the blades, will eddy between the rotor and the trailing edge and between rotor and shield from back-side of the rotor, decreasing the efficiency of the windmill. The inventor suggested to make the blades curved and bowed to diminish the eddies, but it would make the blades more complicated and the eddies still are present when the air will be pushed by the blades in a narrow passage between the blades and the shield from the half of the back side of the rotor.

Two fins, fixed to said shield, are forming pockets of air, one between trailing edge and the wall of the shield, the other for the flow of the air, exiting the blades from both sides of the second fin. It also creates additional eddies for the air, exiting the rotor and for the wind striking the fins from left and right sides, what will cause instability for the position of the shield and for the speed of the rotor. This windmill also does not have any means for rate control for the rotor.

U.S. Pat. No. 4,134,708, Jan. 16, 1979, Brauser et al. This patent describes a wind driven electric power plant comprising a rotor, a shield and a fin, mounted on a vertical, central shaft, a shield and a fin adjustable interconnected via a cog and gear track arrangement. Constant rotor rotation is achieved by masking the rotor by the shield and hydraulic rotation rate control system.

This plant cannot provide necessary safety measures in case of storm, when wind changes directions too quickly and its speed is too high. More than half of the blades will remain open to the wind and the material off the blades will be damaged. To maintain the constant rotor rotation rate it is necessary to constantly move the large shield, which is covering half of cylindrical surface of the rotor, imposing too much strain on cog 304 and gear teeth 286 (see FIGS. 4 and 5). It is too long way to go from gears to points 232, 254 on upper level, 254 to lower level 254 and rotate the flange 238. Since the shield should cover half of the surface of the rotor, the air will eddy near the back cutting edge of the shield. The canvas, used as material for the blades, can not stand too long and requires constant change, as we can see with the flags, exposed to the of wind for a too long time. The power outlet in this plant, as well as in many other previous inventions, is made with traditional transmission means to transmit the power from rotor to speed increaser and generator and do not use the idea of taking off the power with linear motion generator. This plant does not use computer for controlling its operation. In general, the design of this plant is too complicated for using on a large scale. It cannot be used if we will place one turbine above another because the fin is located above the rotor. It cannot be used with horizontal axis of rotation of the rotor.

U.S. Pat. No. 4,093,398, Jun. 6, 1978, Inventor Denver W. Miller describes a wind driven power mechanism, having a sail-type vanes, connected between two endless carriers, moving over upper arcuate run, while lower ends of the vanes are connected to rotatable idlers.

This mechanism does not have any rate control; the sails are subjects for quick wear and tear. The base of the housing can be driven around vertical axis by a motor, connected with pinion gear engaged with a ring gear, but this mechanism does not have any positional system for controlling this motor and finding direction of the wind. That mechanism has additional mechanical links to generator or pump and does not have direct outlet for generating electrical energy.

U.S. Pat. No. 4,930,985. Date of patent Jun. 5, 1990. Inventor Ferdinand Klute, Germany, describes a wind power plant, having wind sails moving along the length of passage structure under the force of the wind one after another in the direction of the wind. But the first sail, that faces the wind, will receive most of the energy of the wind. There is no wind behind it like behind a wall. All other sails will be located in the lee side of first sail, especially in a tunnel (see FIG. 8), so that the energy of the wind will be utilized only from the surface of one blade, all other blades along the chains are not working and senseless, and the force of the wind will be not enough even to move all this conveyors with blades, having big forces of friction along the tracks. We can easy imagine such a long conveyor with blades that even hurricane will not have enough power to move it, although the author suggests (page 11, 20) to protect the plant in case of a hurricane by turning the plant through 90 deg. It's useless also because hurricane change the direction of the wind too quickly. If we will remove al this chains with blades and leave only two turbines 95 with surface of one blade of each of turbines equal to half of the surface of cross section of the tunnel 90, we will utilize the same energy of the wind, that suggest to utilize inventor F. Klute. Approximately similar solution with new design of wind power plant will be presented below in my proposed invention.

In the preview of the prior Art we can see mostly patents issued in the United States, but many authors of these patents live in different counties, representing their inventions in the U.S. The same could be said about many other patents in this branch of Art not cited in this preview.

In the conclusion of the preview of Prior Art we can say that until now there is no satisfactory solution for a wind power plant, which can operate as a unit comprising a plurality of rotors with wide blades under one roof, utilizing higher speed of the wind on higher elevation. There is no such a plant with computer-controlled speed of rotation of these rotors. There is no such a plant that has wind tail that can orient the plant toward general direction of the wind and, at the same time, accelerates the speed of the wind, directed to the turbines. There are only a few plants that are using direct conversion of wind energy into electrical energy, but they have completely different design of the plant. There are a few power plants, which have a plurality of rotors, but they also have completely different design, using narrow propeller type blades or locating rotors one behind another, so that the wind after impacting on the first rotor loses its energy and cannot rotate the second rotor. The known plants, that have a plurality of rotors, do not have means for preventing synchronous speed of rotation of these rotors and can fall apart.

BRIEF SUMMARY OF THE INVENTION

The present invention contemplates a wind driven power plant for producing electrical energy on a big scale in which a plurality of turbines is collected in one housing, rotating around vertical axis on a strong base. The housing is having a lower platform, supportive towers and a roof, forming a rectangular air concourse, adapted for receiving flow of a wind from front side and exiting the wind from back side with general direction of the wind perpendicular to front side. Wind tail is attached to back side of the housing for positioning the housing toward direction of the wind and utilizing the impact of the wind onto outer surfaces of vertical walls, outstretched back from back side of the housing, while inner vertical walls provide tunnel suction inside the wind tail. Each of the turbines faces the wind from the front side of the housing, utilizing all the energy of the wind, and has its own system of wind tunnels, accelerating this wind. Each of turbines is having a rotor, equipped with wide blades. Front deflector, stationary attached to the housing, is deflecting the wind from 90 deg. of front side of the rotor, located above horizontal axis of rotation of the rotor, while leaving opened to the wind the remaining part, located below this axis of rotation. A governor, made in a shape of a 90 degrees arc surface and controlled by computer, changeably covers part or all of the remaining part of the front side of the rotor. Computer is constantly monitoring the speed of rotation of all of the rotors, keeping it constant despite of changes in the speed of the wind or changing it, or stopping the work of part of turbines or stopping the work of all of the turbines and covering surfaces of turbines in case of heavy snow, strong wind or change in demand. Computer also changes the speed of turbines in case of synchronous speed of two or more of them and thus maintaining constant speed of rotation. Electricity is produced by rotation of the system of permanent or electrical magnets, located from both sides of the rotors relative to coils, located on the housing with a small air gap between magnets and coils.

Rotors are equipped with wide blades, what allow to rotate the rotors even with a light wind and to produce a powerful torque. Positioning a plurality of turbines one above another allows to save occupied area of land and utilizes higher speed of wind on higher elevations.

OBJECT OF THE INVENTION

An object of this invention is to provide a wind power plant for generating electrical energy on a big scale, comprising a plurality of turbines, collected under one roof, so that we will not occupy large areas of land, at the same time, increasing the efficiency of turbines by locating them on higher elevations, one above another and using the higher speed of the wind on higher elevations.

Another object of this invention is to the simplify the design and efficiency of the rotors by using wide blades made of thin sheet metal or another rigid, strong and durable material, like plastic.

Another object of this invention is to provide a torque for rotation of the rotors by covering the front side from one side of the axis of rotation by deflectors.

Another object of this invention is to maintain constant speed of rotation of the rotors despite changes in the speed of the wind by using computer controlled and easy operated governors for changeably covering from the wind evaluated part of remaining front side of the rotors, not covered by deflectors.

Another object of this invention is to make these governors smaller and easier operated than known in Prior Art.

Another object of this invention is to provide computerized monitoring of the speed of rotation of the rotors, changing its speed, completely stopping some of the turbines or all of them.

Another object of this invention is to provide computerized controlled difference in the speed of rotation of the rotors to avoid synchronous speed.

Another object of this invention is to provide means for safety during the storm, heavy snow and for maintenance by covering the working surfaces of turbines with deflectors and governors.

Another object of this invention is to provide the housing a possibility of positioning toward direction of the wind by adding wind tail to the back side of the housing and using inner surfaces of this tunnels as means for creating tunnel suction for the flow of the air, passing through the turbines.

Another object of the invention is to provide an outlet for electrical power through converting wind energy into electrical energy directly inside the turbines, without additional mechanical links. For this mutter, rotating parts of the generators are mounted to both sides of the rotors while stationary parts are mounted to the housing with air gaps between rotating and stationary parts and conductor systems positioned inside the housing.

Another object of this invention is to provide means for maintenance and overhaul by installing cranes under the roof of the housing and elevators with stops for every level of the plant.

Another object of this invention is to provide environment friendly plant with muffled noise of the working turbines behind the walls of the housing, deflectors and governors and not harming the bird population with opened blades by covering the entrances and the exits for the air with bird protective nets.

Another object of this invention is to create a wind plant with pleasant aesthetic view by making the plant looking like a skyscraper and covering the towers and wind tail with panels.

Other objects and advantages of the invention will become apparent from a consideration of the drawings and description.

BRIEF DESCRIPTION OF THE SEVERAL VIEWS OF THE DRAWING (FIGS. 1 through 9 represent preferred embodiment)

FIG. 1—is a front view of a wind power plant with a plurality of turbines located one above another between two towers of a housing, rotatable around vertical axis on a base.

Figure 2:
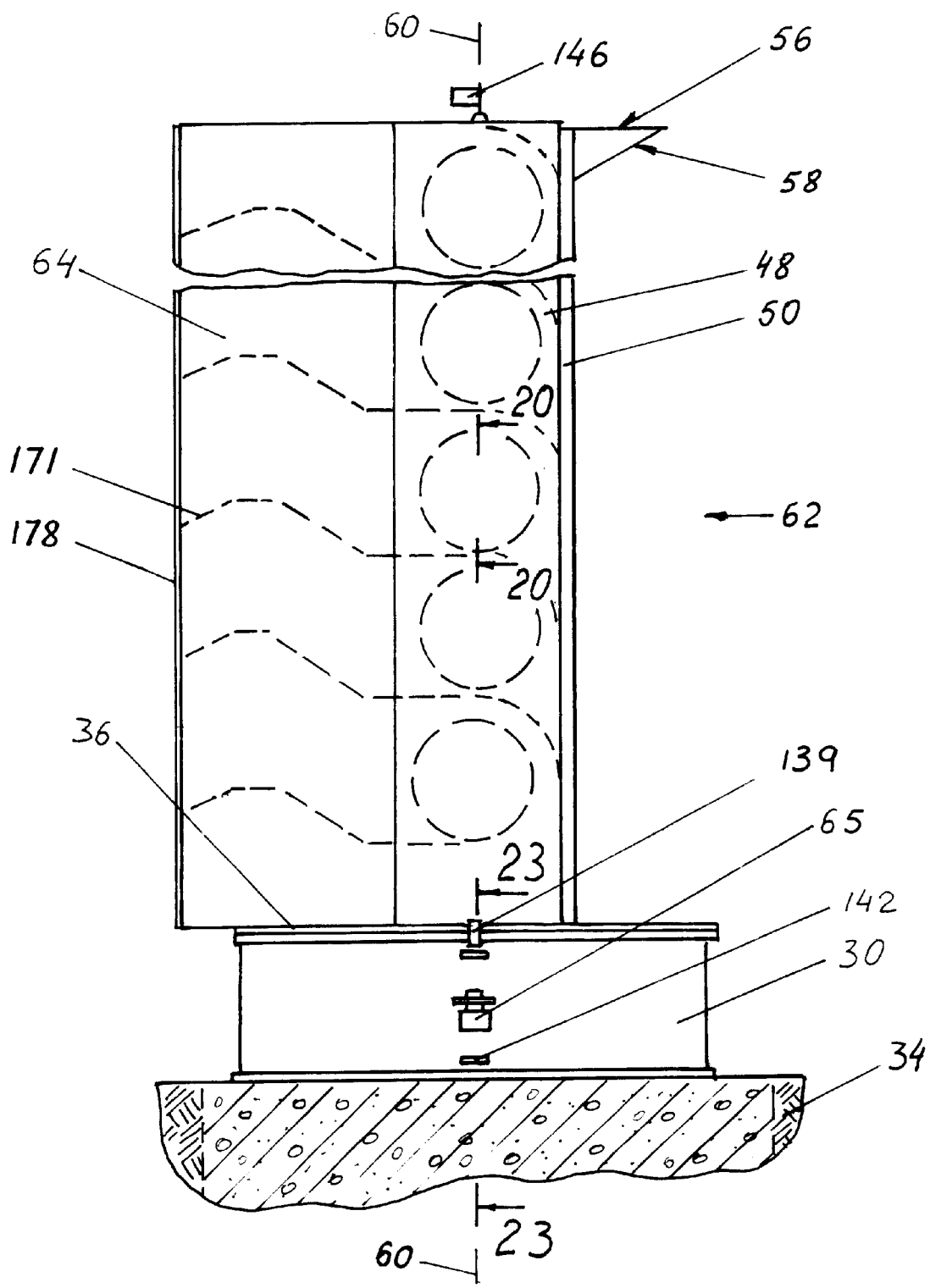
Figure 3:
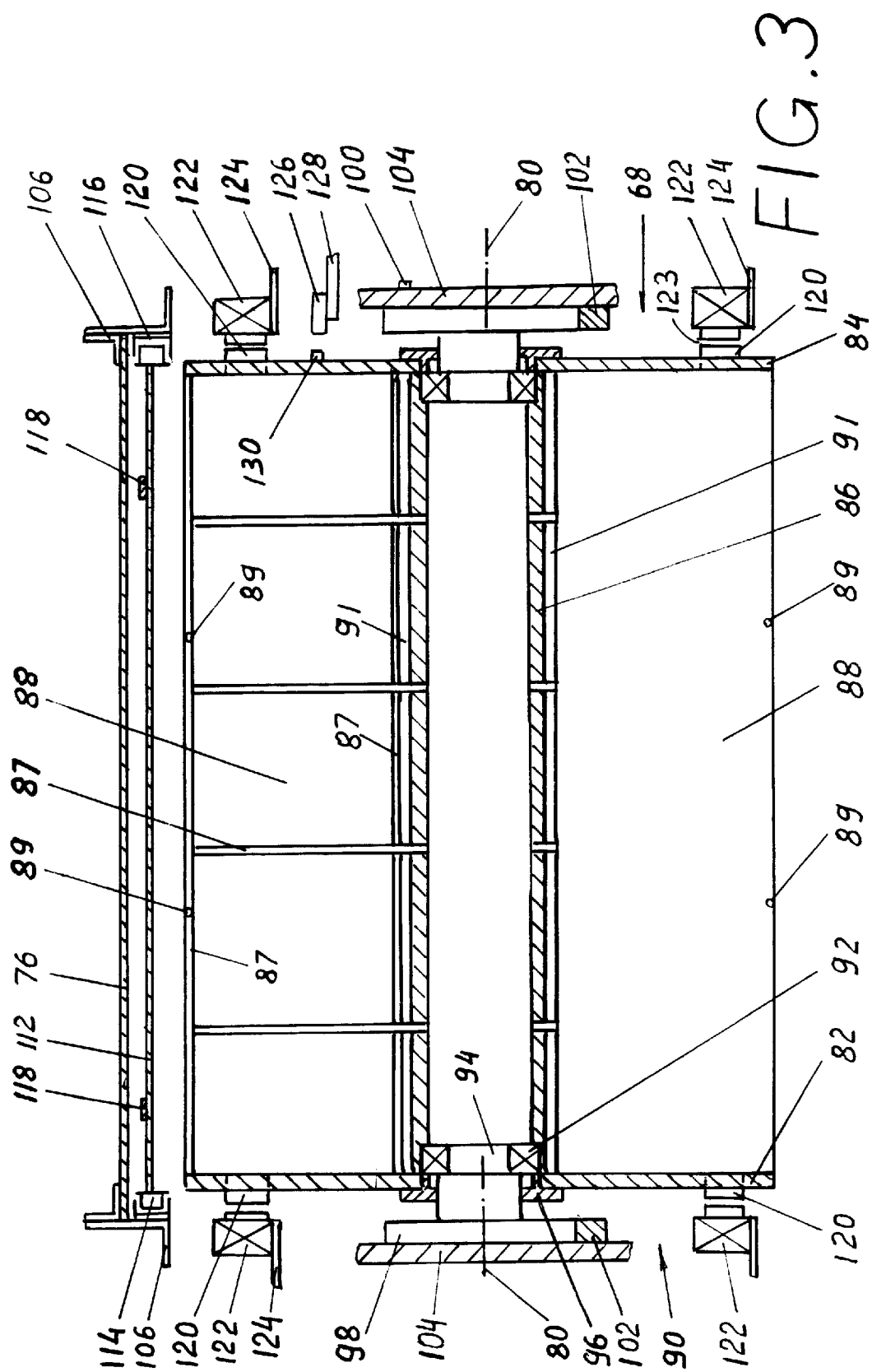

FIG. 2—is a left side view of a power plant of FIG. 1 with a view of a tower, a base and a wind tail FIG. 3—is a cross section of one of turbines, taken away at the line 20—20 of FIG. 2.

Figure 4:
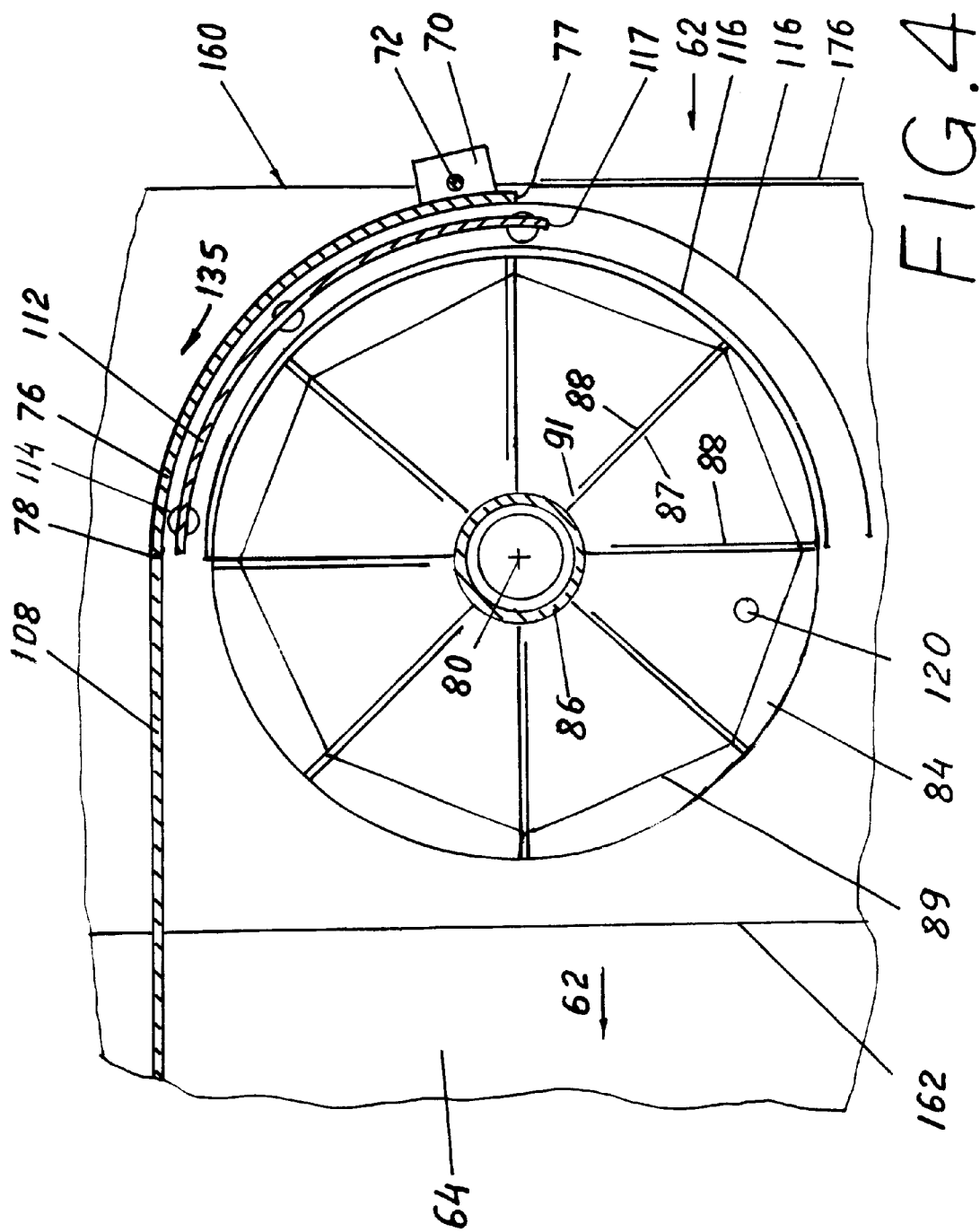

FIG. 4—is a cross section at one of turbines at the line 21—21 of FIG. 1.

Figure 5:
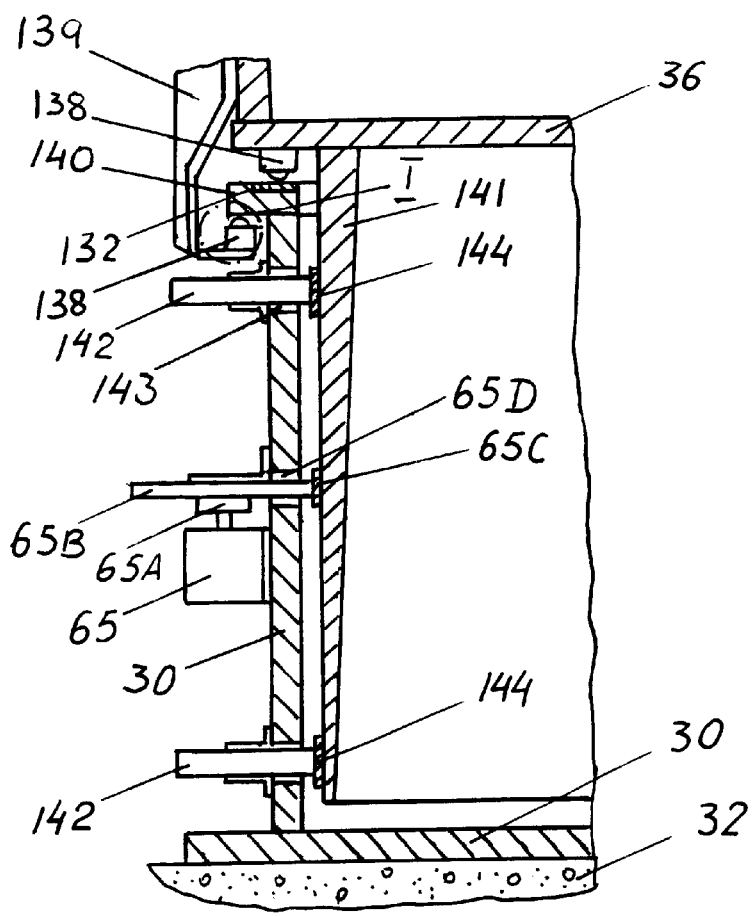

FIG. 5—is a cross section at the line 23—23 of FIG. 2.

Figures 6, 7:
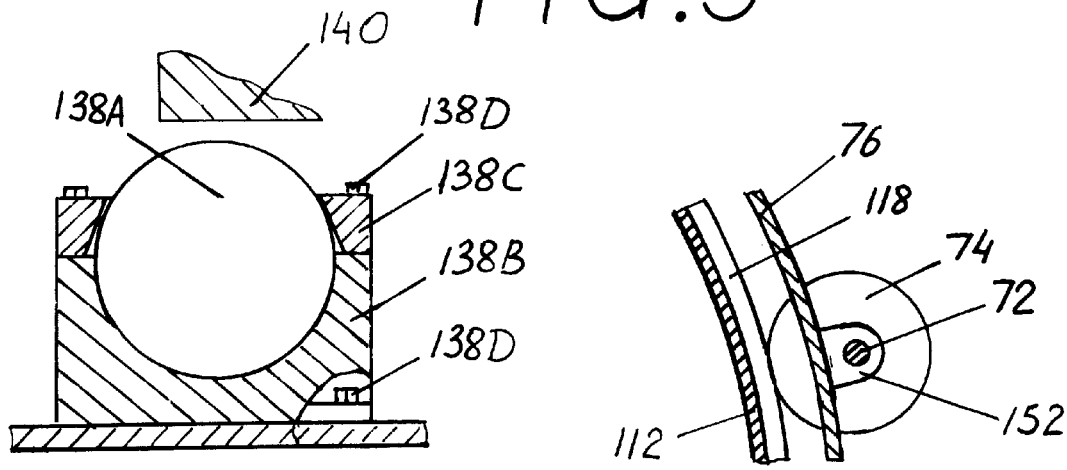

FIG. 6—is an enlarged view of one of bearing boxes of FIG. 5 in circle I, broken away.

FIG. 7—is an enlarged view of an engagement of gear wheel 74 of power drive with gear track 118 of governor 112 in cross section at the line 24—24 of FIG. 1.

FIG. 8—is a top view at the roof of the power plant with a view of the roof, rotatable platform, and wind tail.

FIG. 9—is an enlarged partial view of FIG. 8 in circle II, showing system of positional sensors and weather vane.

FIG. 10—is a front view of a power plant embodiment N2, having a plurality of turbines between three towers.

Figures 11, 12:
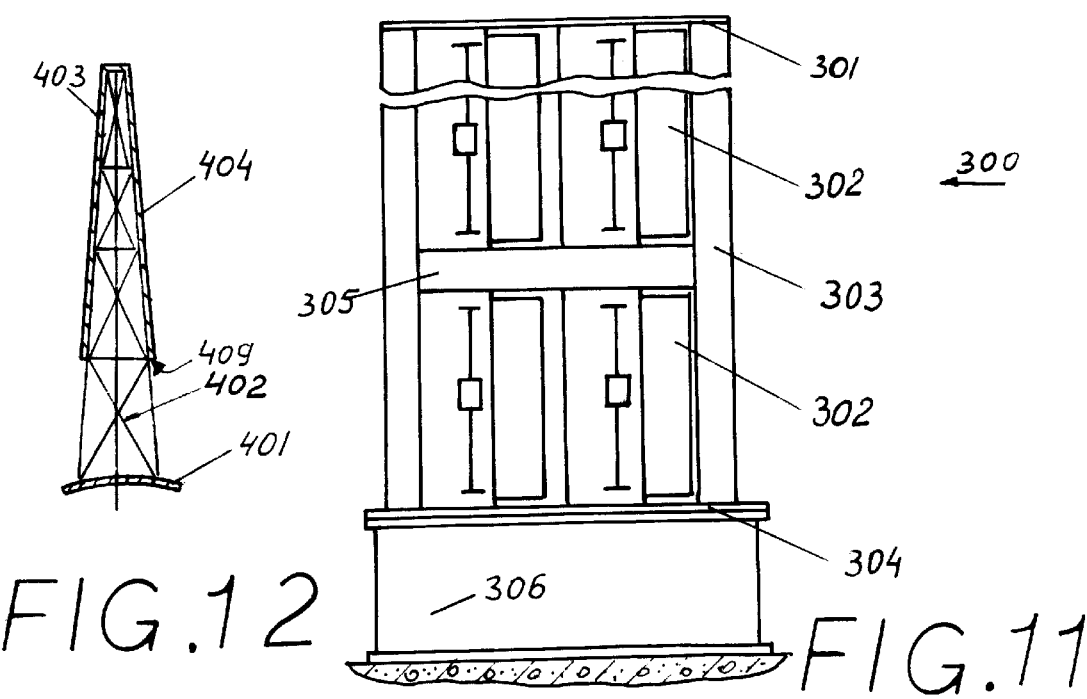

FIG. 11—is a front view of a power plant embodiment N3, having a plurality of turbines between two towers. The turbines have vertical axes of rotation of rotors.

FIG. 12—is a view of blade of a rotor of a power plant embodiment N4.

Figure 13:
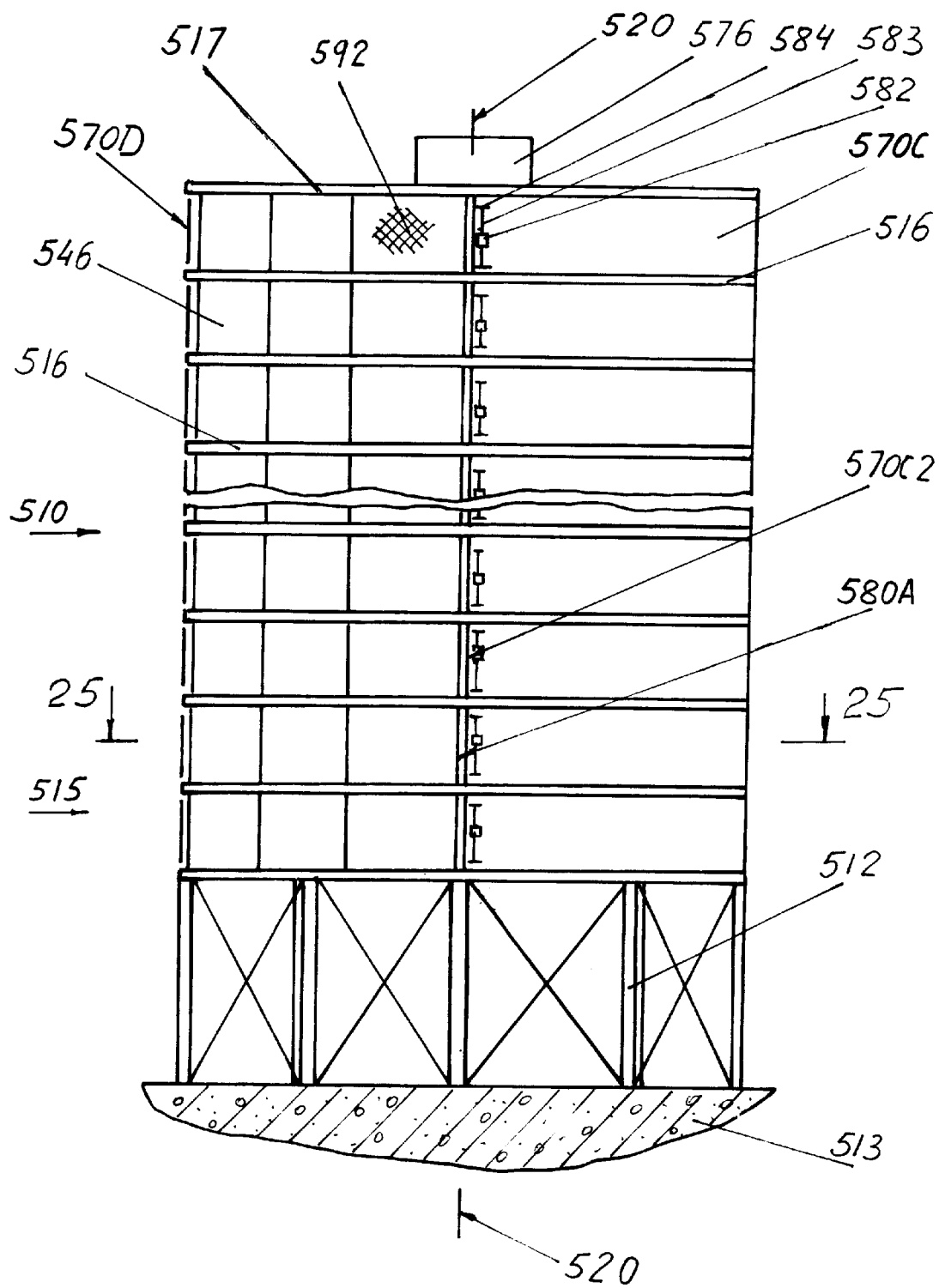
Figure 14:
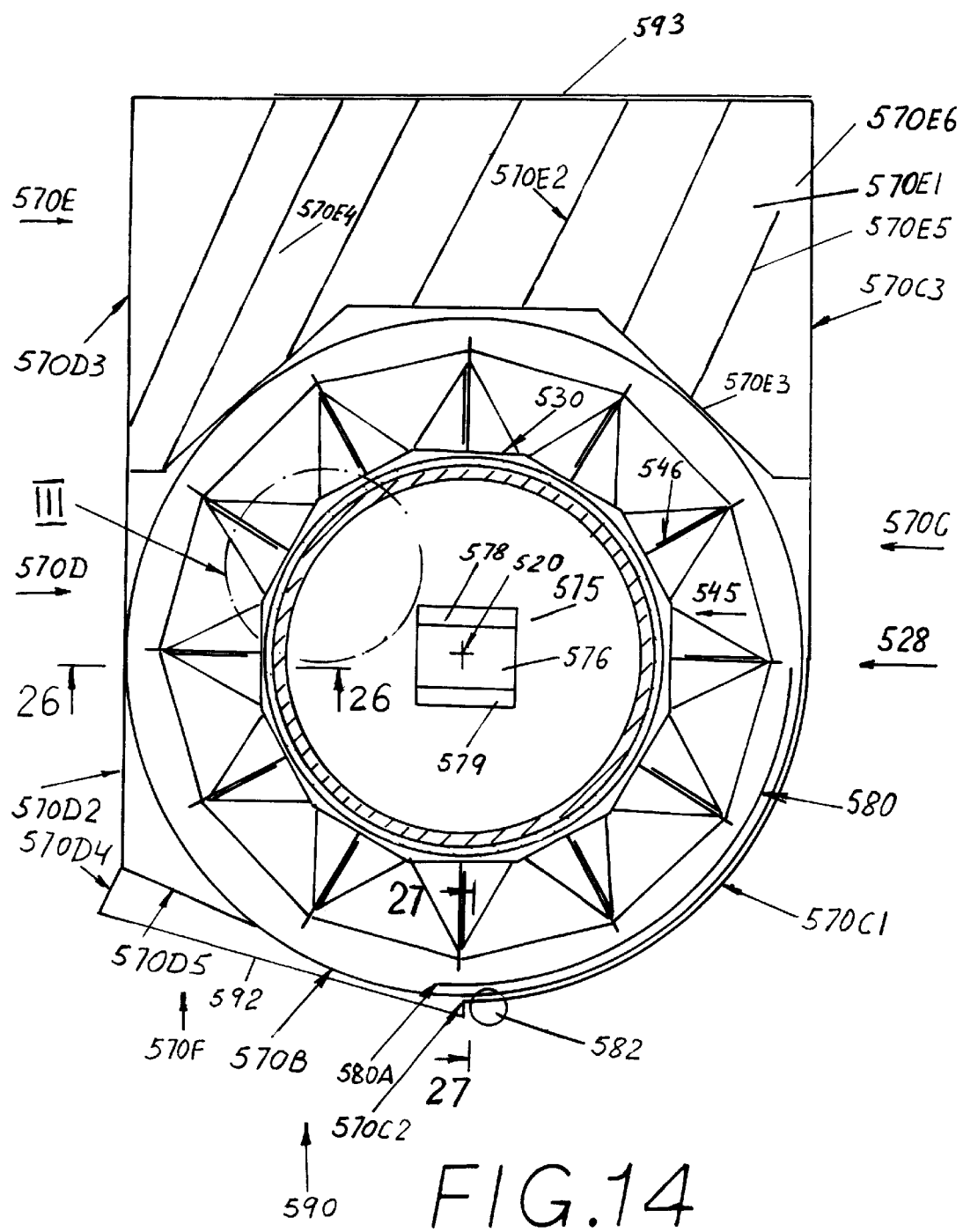
Figure 15:
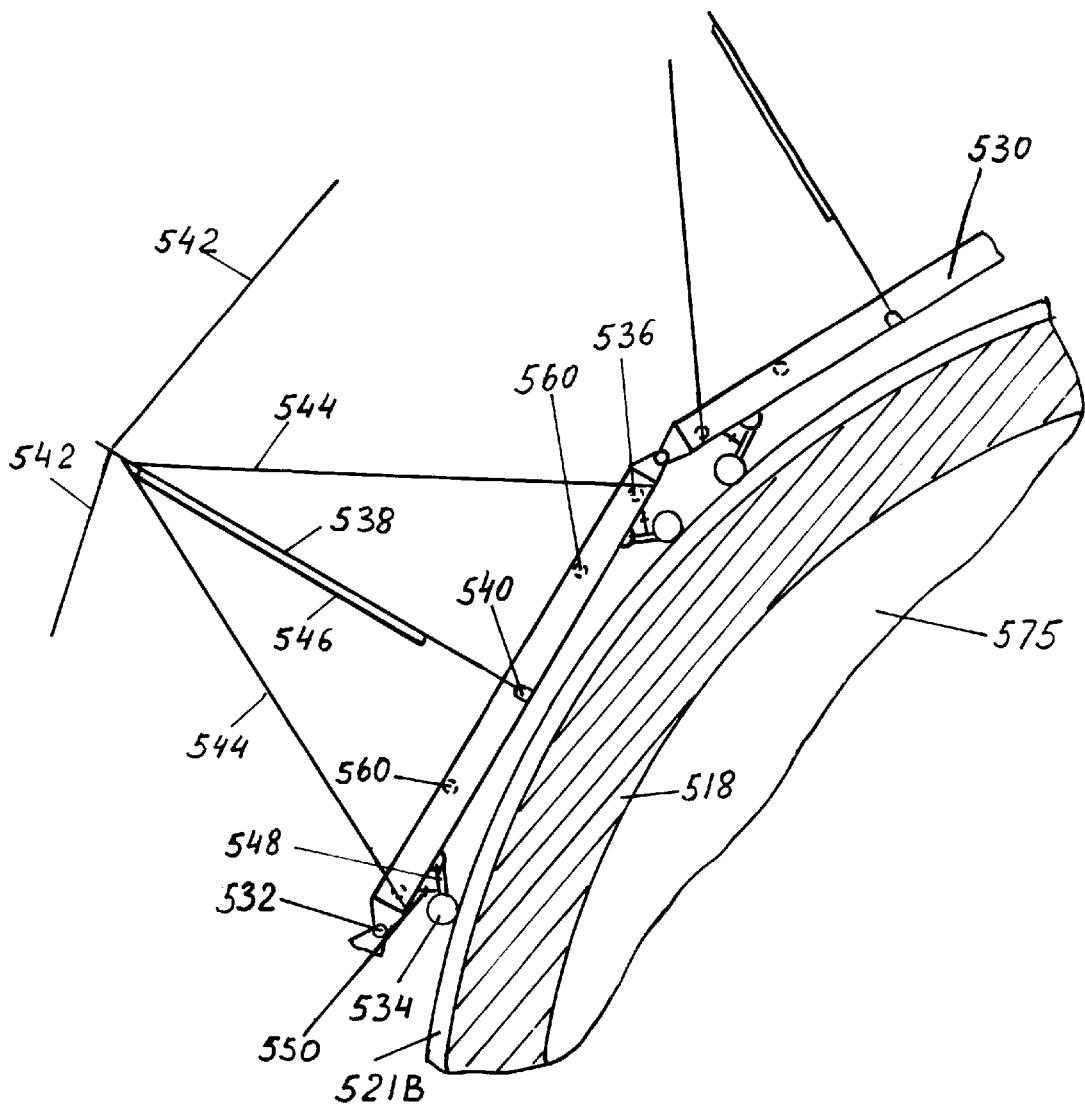

(FIG. 13 through FIG. 15 indicate a power plant embodiment N5)

FIG. 13—is a front view of a power plant embodiment N5, having a plurality of turbines, mounted along balconies of the housing around vertical axis.

FIG. 14—is a schematic top view of one of turbines in cross section at the line 25—25 of FIG. 13.

FIG. 15—is a schematic enlarged view of a part of turbine of FIG. 14 in circle III, broken away.

Figure 16:
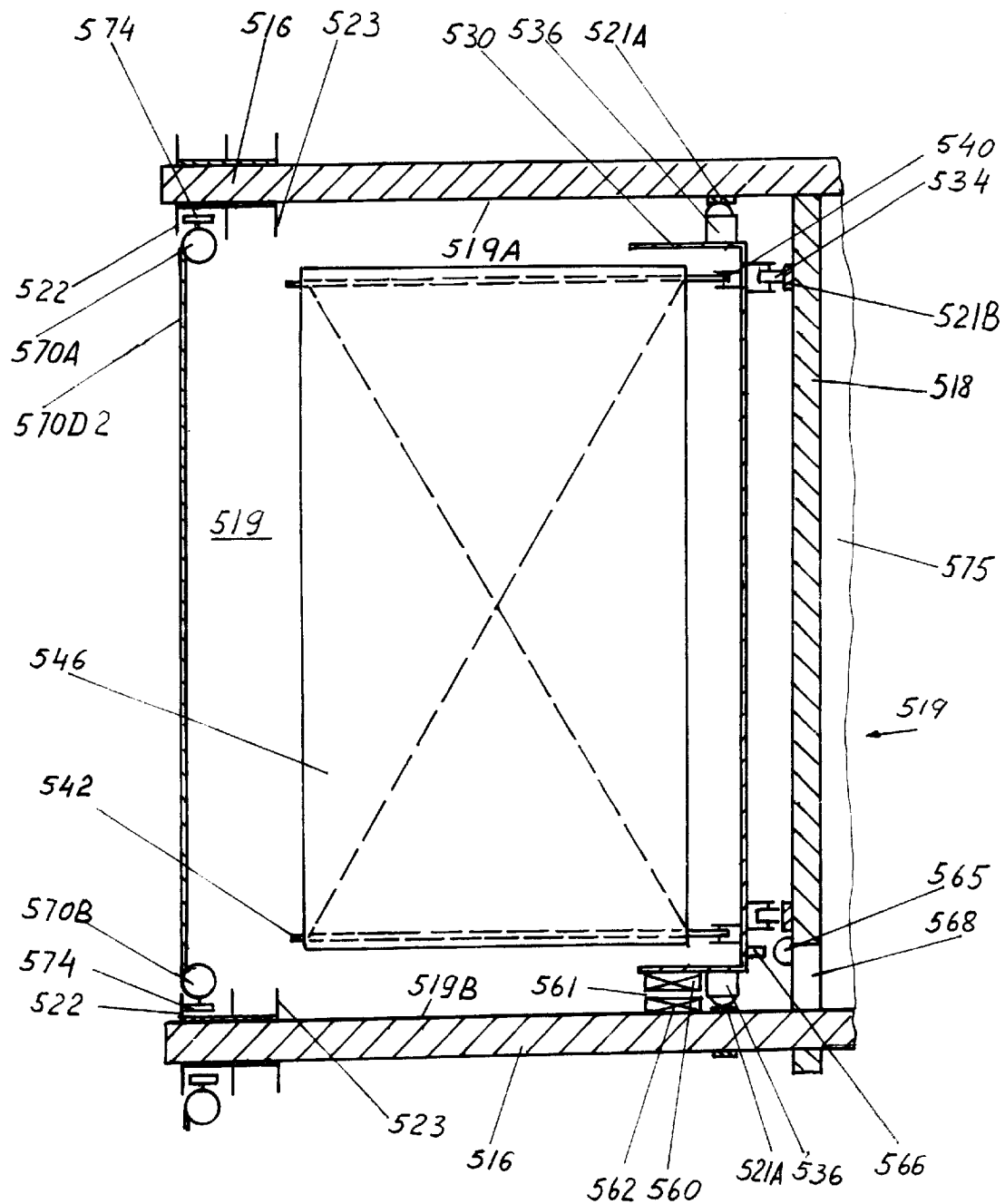

FIG. 16—is a partial cross section of one of turbines broken away from the left side of axis of rotation at the line 26—26 of FIG. 14.

Figure 17:
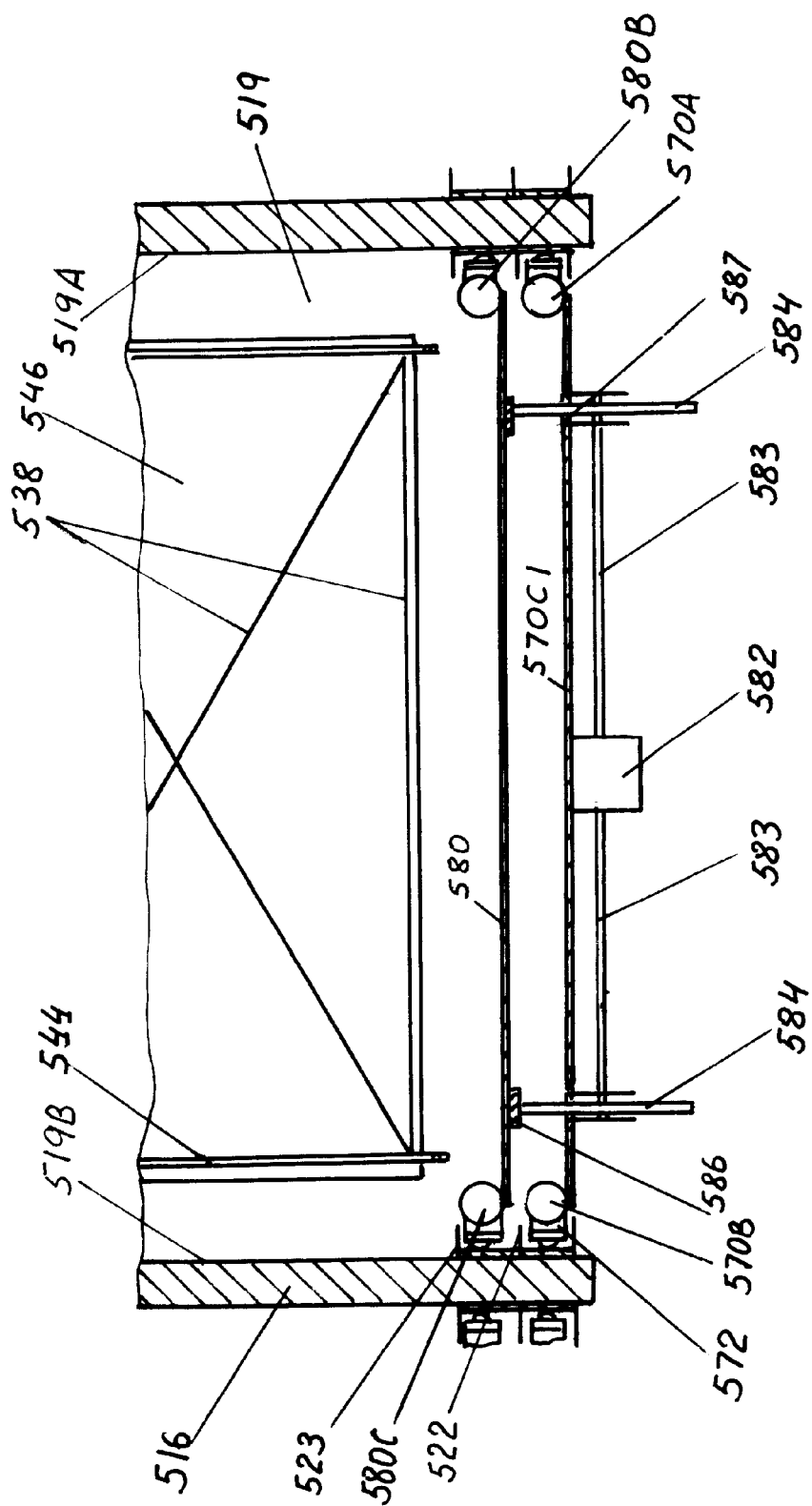

FIG. 17—is a partial cross section of one of the turbines at the line 27—27 of FIG. 14.

DETAILED DESCRIPTION OF THE INVENTION

1) Reference Numerals In Drawings

| | |
|---|---|
| 30 | base |
| 32 | concrete frame |
| 34 | ground |
| 36 | horizontal platform |
| 38 | left tower |
| 40 | right tower |
| 42 | roof |
| 44 | housing |
| 46 | framework |
| 47 | floor |
| 48 | decorative panel |
| 50 | left shaft for elevators & stairs |
| 52 | right shaft for elevators & stairs |
| 54 | crane |
| 56 | beam |
| 58 | strut |
| 60 | vertical axis |
| 62 | general direction of the wind |
| 64 | wind tail |
| 65 | servomotor |
| 65A | electro-magnetic clutch |
| 65B | gear wheel |
| 65C | gear track |
| 65D | window |
| 68 | turbine |
| 70 | power drive |
| 72 | shaft |
| 74 | gear wheel |
| 76 | deflector |
| 77 | front cutting edge of deflector |
| 78 | back cutting edge of deflector |
| 80 | horizontal axis of rotation of rotor |
| 82 | left disk |
| 84 | right disk |
| 86 | tube |
| 87 | light framework |
| 88 | blade |
| 89 | strut |
| 90 | rotor |
| 91 | air gap between blade and tube |
| 92 | bearing |
| 94 | hub |
| 96 | collar |
| 98 | flange of hub |
| 100 | bolt |
| 104 | fixing plate |
| 106 | bracket |
| 108 | back deflector |
| 112 | governor |
| 114 | wheel of governor |
| 116 | track |
| 117 | front cutting edge of governor |
| 118 | gear track |
| 120 | permanent or electrical magnet |
| 122 | coil |
| 123 | air gap between magnet and coil |
| 124 | bracket |
| 126 | speed control sensor |
| 128 | bracket |
| 130 | actuator |
| 132 | circular rail |
| 138 | bearing box |
| 138A | ball |
| 138B | housing |
| 138C | cover |
| 138D | bolt |
| 139 | bracket |
| 140 | collar |
| 141 | bottom |
| 142 | horizontal wheel |
| 143 | window in the base |
| 144 | rail ring |
| 146 | weather vane |
| 148 | actuator |
| 150A | sensor |
| 150B | sensor |
| 150C | sensor |
| 150D | sensor |
| 150E | sensor |
| 152 | support |
| 160 | front side of the housing |
| 162 | back side of the housing |
| 166 | outer vertical tail wall |
| 168 | inner vertical tail wall |
| 170 | tail roof |
| 171 | tail floor |
| 172 | tail tunnel |
| 174 | back of the wind tail |
| 176 | front bird protective net |
| 178 | back bird protective net |
| 200 | power plant of second embodiment |
| 202 | turbine |
| 203 | tower |
| 204 | horizontal platform |
| 205 | base |
| 300 | power plant of third embodiment |
| 301 | roof |
| 302 | turbine |
| 303 | tower |
| 304 | horizontal platform |
| 305 | floor |
| 306 | base |
| 401 | central tube |
| 402 | light framework |
| 403 | blade |
| 404 | blade |
| 409 | edge of the blade |
| 510 | power plant, fifth embodiment |
| 512 | support base |
| 513 | concrete frame |
| 515 | housing |
| 516 | floor |
| 517 | roof |
| 518 | wall |
| 519 | balcony |
| 519A | ceiling of the balcony |
| 519B | floor of the balcony |
| 520 | vertical axis |
| 521A | horizontal rail |
| 521B | vertical rail |
| 522 | second setting of rails |
| 523 | third setting of rails |
| 528 | turbine |
| 530 | carriage |
| 532 | hinge |
| 534 | horizontal wheel of carriage |
| 536 | bearing box of carriage |
| 538 | light frame |
| 540 | connector |
| 542 | bracing cable |
| 544 | bracing cable |
| 545 | rotor |
| 546 | blade |
| 548 | lever |
| 550 | bolt |
| 560 | magnet |
| 561 | air gap between magnet & coil |
| 562 | coil |
| 565 | speed control sensor |
| 566 | actuator |
| 568 | door in the wall |
| 570 | stabilizer |
| 570A | upper ring |
| 570B | lower ring |
| 570C | wind deflector |
| 570C1 | blended part of front wind deflector |
| 570C2 | front cutting edge of wind deflector |
| 570C3 | straight tail part of wind deflector |
| 570D | wind accelerator |
| 570D2 | front part of accelerator |
| 570D3 | tail part of accelerator |
| 570D4 | bended front part of accelerator |
| 570D5 | strut |

-continued

| | |
|---|---|
| 570E | wind tail |
| 570E1 | tail roof and tail floor |
| 570E2 | tail wall |
| 570E3 | trimmed front edge of tail floor & roof |
| 570E5 | right inner tail wall |
| 570E4 | wind tunnel |
| 570E6 | opening between right wall & deflector |
| 570F | entrance for the wind flow |
| 572 | bearing box |
| 574 | horizontal wheel |
| 575 | inner area |
| 576 | shaft for elevators and stairs |
| 578 | elevator |
| 579 | stairs |
| 580 | governor |
| 580A | cutting edge of governor |
| 580B | upper segment of a ring |
| 580C | lower segment of a ring |
| 582 | power drive |
| 583 | shaft |
| 584 | gear wheel |
| 586 | gear track |
| 587 | window in the surface of deflector |
| 590 | general direction of the wind |
| 592 | front bird protective net |
| 593 | back bird protective net |

2) Description of the Preferred Embodiment of FIGS. 1 Through 9

On FIG. 1 we can see a cylindrically shaped base 30, firmly attached to a concrete frame 32 with heavy filling material for stability and located in solid ground 34. Horizontal platform 36 is rotatable and attached to cylindrical top of base 30 (specifics, which we will describe later, are shown on FIG. 5). Two towers, left 38 and right 40 are firmly fixed to platform 36 and covered with a roof 42, forming a housing, generally designated to number 44. Inner surfaces of the towers 38, 40, platform 36 and roof 42 are forming a rectangular air concourse, opened to the flow of the wind, entering the concourse from front side 160 and exiting the concourse from back side 162 of the housing 44 (see FIG. 8). Towers 38, 40 comprise solid frameworks 46. Number 47 indicates floors on different levels of the towers. Frameworks 46 are covered with decorative panels 48. Two shafts with elevators and stairs, left 50 and right 52, are attached to front side of the towers. Crane 54, capable of moving inside the housing 44 and outside on beams 56 is installed under the roof 42 between the towers 38 and 40. Struts 58 are enforcing the beams 56 (see FIG. 2). Vertical axis 60-60 designates axis of rotation of the housing toward direction of the wind 62 under the influence of the wind on wind tail 64 or with additional help of servomotor 65. Number 68 designates generally one of plurality of turbines, installed one upon another in concourse between the towers 38 and 40. Power drive 70, shafts 72, and gear wheels 74 are installed on a surface of a front deflector 76, which is attached to front upper side of turbine 68 to the towers 38 and 40. Deflector 76 is shaped as a shield for covering from the wind the front side of turbine 68 above horizontal axis of rotation 80-80 (see FIG. 3 and FIG. 4). Deflector 76 is made of thin sheet metal bended into a 90 degrees arc surface with front cutting edge 77 disposed in a horizontal plane crossing the axis of rotation 80, and back cutting edge 78 disposed in a vertical plane, crossing the same axis, and both cutting edges are disposed parallel to the same axis of rotation 80.

FIG. 3 shows a front view of one of turbines 68 in a cross section along horizontal axis of rotation 80-80. Left disk 82 and right disk 84 are connected with a tube 86. A system of light frameworks 87, made of thin tubes, is disposed evenly around the tube 86 between the disks 82, 84 and fixed to them and to the tube. Wide blades 88 are attached to frameworks 87. Blades 88 are made of thin sheet metal or another strong and durable material and fixed to the frameworks, facing the front side of the housing below the axis of rotation 80-80. Struts 89 are connecting together frameworks 87, forming a rigid and balanced ring of frameworks 87, blades 88, disks 82 and 84 and tube 86, which we will name as a rotor 90. Instead of struts 89 bracing cables can be used to provide rigidness between frameworks 87. Blades 88 are fixed to frameworks 87 with a gap 91 between the blades and the tube 86 to avoid eddies of the air during rotation of the rotor. Bearings 92 are installed inside the tube 86 from both sides of the tube and fixed with collars 96. Two hubs 94, having flanges 98, are pressed inside the bearings 92 from outside of the disks 82 and 84, so that all that assembled rotor can be installed on anchors 102 between fixing plates 104, disposed on frameworks 46 of towers 38 and 40 and fixed with bolts 100.

Front deflector 76 is attached by brackets 106 to frameworks 46 of the towers 38 and 40, what makes easy to remove and to install back deflector 76 and rotor 90 during construction or overhaul of the turbines 68. Governor 112 is shaped as a shield, capable for covering the remaining part of front side of the rotor 90, not covered with deflector 76, located below the axis of rotation 80-80. Governor 112 is made of thin sheet metal or other strong and durable material bended into a 90 degrees arc surface with a diameter bigger than diameter of rotor 90 but lesser than diameter of deflector 76. Governor 112 is equipped with wheels 114 that allow moving it along the tracks 116, attached by brackets 106 to frameworks 46 of the towers 38 and 40. Number 117 designates the front cutting edge of governor 112, disposed parallel to cutting edge 77 of deflector 108 and axis of rotation 80-80. Two gear tracks 118, attached to outer surface of governor 112, are disposed opposite to gear wheels 74 and engaged with them through windows on the surface of deflector 76. Speed control sensor 126 is attached to a bracket 128, fixed to the housing 44. Actuator 130 is installed on the disk 84 opposite to the sensor 126 with possibility to activate this sensor when it will pass it, revolving together with the rotor 90.

On FIG. 3 we can see means for converting the energy of revolving rotor into electrical energy. These means consist of moving parts- permanent or electrical magnets 120, attached to left 82 and right 84 disks, distributed evenly and at the same radius around axis 80-80, and close to that axis, and stationary parts, coils 122, fixed with a small air gap between them and magnets 120 and distributed evenly and at the same radius on brackets 124, fixed to frameworks 46. Only one of magnets 120 is shown on FIG. 4. The conductor system (not shown) is mounted inside the housing 44. Since the magnets 120 are disposed close to axis 80, lesser energy is needed to rotate them, rotating mass is lesser, and it is easier to provide small air gap between magnets and coils, increasing efficiency of the turbine.

On FIG. 5 we can see part of horizontal platform 36, installed with possibility to rotate upon circular rails 132, attached to base 30, on bearing boxes 138. Another set of bearing boxes 138, fixed on brackets 139, is installed to limit vertical movements of housing 44 by contacting the collar 140 (only one of this brackets 139 is shown on FIG. 2). Cylindrical shaped bottom 141 is fixed to horizontal platform 36. Horizontal wheels 142 are mounted to cylindrical outer surface of base 30 and through windows 143 in the base 30 are contacting with rail rings 144, fixed to bottom 141. This assemble of bearing boxes 138 and wheels 142 allows to move the housing 44 around vertical axis 60 toward general direction of the wind under impact of the wind on the wind tail 64. The design of bearing boxes 138 we can see on FIG. 6 Bearing box 138 comprise a ball 138SA, housing 138B and cover 138C fixed together with bolts 138D.

FIG. 7 shows assembly of means for moving the governor 112 relative to deflector 76. Supports 152 are fixed to the surface of deflector 76 and holding shafts 72 with gear wheels 74, engaged with gear track 118, fixed to governor 112.

FIG. 8 is a top view of a power plant. We can see the horizontal platform 36 roof 42, shafts with elevators and stairs 50 and 52, beams 56, weather vane 146, installed on the roof 42. Number 160 indicates front side of the housing, facing general direction of the wind where the wind entering the concourse between the towers 38 and 40. Number 162 indicates back-side of the housing, where the wind exits the housing. Number 64 generally indicates wind tail, created by two outer vertical walls 166, attached to the back-side 162 of the housing 44. Tail roof 170 and tail floors 171 (see FIG. 2), are also attached to the back-side 162 and to walls 166 of the housing 44. Tail floors 171 are attached to back cutting edges of back deflectors 108, and inner vertical walls 168 are evenly fixed between them. All these walls and floors are outstretched back from back-side of the housing 94, and inner surfaces of these walls and floors are creating a system of tunnels 172 for the flow of the air, exiting the rotors from back-side 162 of the housing to the entrances of the tunnels 172 and through these tunnels to the exits 174. Floors 171 are bended in upper direction at the entrances of the tunnels 172 and bended in lower direction closer to the exits of the tunnels, what makes longer the way for the flow of the air, increasing tunnel suction, and prevents the inner areas of the tunnels 172 from snow and rain.

FIG. 9 shows additional means for positioning of the housing 44 toward general direction of the wind. 62. Small weather vane 146 is installed on the roof 42 with possibility to rotate around vertical axis 60. Actuator 148 is mounted to the end of the arm of the weather vane 146. A system of sensors 150 is installed on the roof circumferentially in a way that when weather vane 148 will carry actuator above the sensors, each of them can send a signal to the computer, indicating direction of the wind. Sensor 150A indicates the position of the housing in general direction of the wind. Other sensors are indicating different angles of the front side of the housing toward general direction of the wind. In snowy areas the positional system can be placed instead of the roof on other covered surfaces of the house, for example on platform 36.

On FIGS. 1 and 4 we can see front bird protective net 176, covering entrances to the turbines for the birds. On FIGS. 2 and 8 we can see the bird protective net 178, covering the exits of the tail wind tunnels. The nets can be maid of steel wire or strong plastic. The size of the openings of these nets can be chosen by the size of the birds in the area around the plant.

3) Operation of the Power Plant of the Preferred Embodiment

As we can see on FIG. 1, power plant comprises a cluster of turbines. The number of turbines is optional and can be varied from 1 to a number, chosen by estimating the needs for electric energy, prevailing power of winds, possibilities of creating high structures and other factors.

Each of turbines operates in a similar way. Power plant is always oriented toward the general direction of the wind 62 by impact of the wind on the outer verticall surfaces 166 of the wind tail 64, (see FIG. 2 and FIG. 8), rotating the housing 44 on horizontal platform 36 relative to the cylindrical base 30 and collar 40 (see FIG. 5). A plurality of bearing boxes 138, installed under the platform 36, is carrying the weight of the housing 44, while another set of bearing boxes 138, installed on the brackets 139, prevents the housing 44 from overturning by the wind. Wheels 142 are keeping the housing 44 concentric about vertical axis 60-60 by engaging with rails 144, attached to the cylindrical bottom 141. A computer (not shown on the drawings and can be located far away) is monitoring the position of the housing toward the wind by receiving signals from a system of positional sensors 150, located on the roof 42 (see FIG. 9), activated by the movement of actuator 148, located on a small weather vane, rotatable around vertical axis 60. Each of the sensors 150 has its own code in the computer. The first sensor, 150A is located on the radius from the axis 60 perpendicular to the front side of the housing and when actuator 148 is located opposite to this sensor, it means, that housing 44 is oriented right with front side facing general direction of the wind. If the actuator 148 is turned toward sensors 150B, 150C or 150D, 150E and remains there without moving back for a period of time, allowed by the program of the computer, it means, that the power of the wind is not enough for orienting the housing toward the wind by impacting on the wind tail 64. In this case computer sends a signal to servomotor 65 (see FIG. 5) with electro magnetic clutch 65A. A gear wheel 65B, connected with clutch 65A, will begin to revolve and by engaging through windows 65D with gear track 65C will return the housing 44 to a position where actuator 148 will be returned back, above sensor 150A and the directions of small weather vane 146 will be perpendicular to front side of the housing and to axis of rotation of turbines. If the power of the wind is enough for positioning the housing 44 by impacting on the wind tail 64, the computer will not receive signals from sensors other than sensor 148, the clutch 65A will be disconnected and gear-wheel 65B will be rotating idle.

The work of each of the turbines in the connection with deflectors 76 and governors 112 will be better understood on FIG. 4. Usually, when the turbine is operated at full speed, the governor 112 is located behind the deflector 76, where it does not influence on the work of turbine. The front cutting edge 77 of deflector 76 is constantly located in a horizontal plane, crossing the axis 80, and the cutting edge 117 of governor 112 will be located higher than this plane, while deflector 76 is used as a shield for the front surface of the turbine, located above this horizontal plane. If the wind 62 is becoming too strong, the governor 112 will be moved clock-wise so that cutting edge 117 will be moved lower than cutting edge 77, as it shown on FIG. 4. The wind 62 will impact on the blades 88 located below of cutting edges 77 and 117. The wind, blowing higher of the cutting edge 77, will be deflected with the outer curved surface of deflector 76 in direction 135 of the open blades of neighboring turbine, located above, increasing its efficiency.

Since the blades that are located higher of the axis 80, are covered from the wind 62 with the shield of deflector 76 and the wind is impacting only on the blades, located lower of the cutting edges 77 and 117 and axis 80, it creates a torque, rotating the rotor 90 clockwise around the axis 80. A gap 91 between the blades 88 (see FIG. 3) and the tube 86 prevents eddying of the air during the rotation of the blades.

A big, flat surface of the blades 88 can interfere with all the wind, blowing through the cross section of area, equal the surface of this blade. Since the width of the blade between the disks 82 and 84 can be very big, it makes the working surface of proposed turbine much bigger than any of the narrow propeller type turbines. As a result, the efficiency of one of the proposed turbines will be equal to efficiency of as many propeller type turbines with narrow blades of equal height, as we can fit in the distance between disks 82 and 84. By locating, for example, five turbines one upon another, as we can see on FIG. 1, we create an opportunity to use the impact of the wind on a surface of five blades, disposed perpendicular to direction of the wind. If we will build one large turbine with the same design and with the surface of one blade equal to the sum of the surfaces of five small blades and outer diameter of one big turbine equal to the sum of five small turbines, the contour of both compared plants from the front view like in FIG. 1 will be the same, but from the side view, like on FIG. 2, one big turbine with one big rotor of such diameter will be five times larger because its width should even be bigger than this big diameter. It means that one big turbine will have much more weight than five smaller turbines. Such a big rotor will be very difficult to balance, it can become unstable and will fall apart. By proposed invention we can build a plant having, for example, 20 or 30 turbines, disposed one upon another and still this plant will have a compact design with balanced, not very big, but efficient rotors, and a housing, looking like a skyscraper.

Wide blades 88, made of thin sheet metal or other strong and rigid material, are attached to thin flat frameworks 87 in a way that the blades are facing the wind with one side and frameworks are located on another side of the blades. Struts, made of thin tubes, are installed between the frameworks to provide rigid ness to the frameworks and to avoid vibration of the blades. Such a rigid cage with blades will revolve much smoother than in the case with separated blades. We can make this system of light frameworks so rigid, that we'll not need the central tube 86 between bearings 92, diminishing the weight of the rotor.

Permanent or electrical magnets 120 are fixed to the sides of disks 82 and 84 and rotating together with rotor with a constant small air gap 123 between them and coils 122. Coils 122 and magnets 120 are disposed circumferentially on the same radii and the motion of the magnets against the coils induces electrical current in coils 122. Contemporary magnets provide possibilities to create generators with relatively large gaps, but the bigger will be air gaps, the bigger will be energy losses. In our case, the tolerance between the coils and magnets can be very small, especially by location the magnets and the coils closer to axis of rotation 80-80.

As we already know, deflectors 76 perform several tasks: to shield the blades of the turbine, located above the horizontal axis of rotation 80-80, to cover governor 112, to provide mounting surface for power drive, for shaft 72 and gears wheels 74, and to deflect the wind, blowing in the area above the axis 80-80 in the direction of the blades, located above, in general angle approximately 45 degrees, increasing efficiency of the upper turbine. By attaching with brackets 106 to towers 38 and w 40, the deflectors 76 are increasing the rigid ness of the plant. Back deflectors 108 can be used as floors between the turbines during the maintenance, but during the work of the plant they divide the flow of the air between neighboring turbines and are attached to tail floors 171 of the wind tail 64, outstretched back from back side of the housing 44.

When the governor 112 is hiding completely behind the deflector 108 and the cutting edge 117 is located above the cutting edge 77, all the surfaces of the blades located lower of the horizontal plane, crossing through the cutting edge 77 and axis 80 are open to the impact of the wind, and the turbine will work at full speed for existing speed of the wind, producing maximum possible amount of energy. The speed control sensor 126 receives signals from actuator 130 with every revolution of the rotors and sends this signals to the computer to evaluate the time between the signals. If the speed of the wind increases too much, the rotor 90 begins to rotate too quickly and the time between the signals from the sensor 126 is becoming too short, the computer sends signal to power drive 70 to put into motion governor 112, shafts 72 begins to rotate gears wheels 74, engaged with gear-tracks 118, attached to governor 112 and moving it clockwise on FIG. 4, so that it covers part of the surface of the blades, located lower of axis of rotation 80, diminishing the impact of the wind on the blades and consequently, return the speed of rotation of the rotor to its previous rate. If the speed of the wind diminishes, the time between the signals from sensor 126 is becoming bigger and computer sends command to move the governor 112 anti-clockwise, in reverse, to open more of the surface of the blades to wind and, once again, return to constant speed or rotation of the rotor 90. As we can see, the governor 112 can be moved very often, so it is important, that it is made as a light shield, covering only 90 degrees of cylindrical surface of the rotor and it is easy to rotate it along the tracks 116.

In a case of a very strong wind or a storm or heavy snow or for maintenance, the computer can send signal to completely cover all surfaces of the blades, moving the governor 112 all the way down and stopping the rotor 90. Sometimes during the day or night we can stop one or several of the turbines because we don't have demand for the full amount of energy that we can produce. This task is also easy to perform by sending the commands through the computer.

Another task for computer is to monitor the rate of rotation of the turbines and not allow two or more of them to revolve with synchronous speed. In this case, computer will send commands to change the speed of some of the turbines. Additional task for computer is to analyze the position of the housing 44 toward the direction of the wind 62 by monitoring the signals from sensors 150 and operating of the additional servomotor 65 and electro magnetic clutch 65A.

Crane 54, installed under the roof 42, can be used during the construction of the plant. With the help of the crane we can first install the complete assembled lower turbine on the anchors 102, attach the flanges 98 by bolts 100 to fixing plates 104, attach tracks 116, install governor 112,then attach deflector 76 to the brackets 106. After installing the first turbine, we can repeat all this actions for the second turbine and so on. It is also easy to perform the overhaul by using the crane 54 and shafts with elevators 50 and 52 with stops for each of turbine.

From aesthetic point of view, the proposed plant can become a landmark for area where it will be located. It can look like a tall skyscraper, covered with decorative panels to shine under the sun and reflect lights in the dark. The wind tail also can be covered with decorative panels or painted. It will show the direction of the wind from the distant horizon. The plant will not occupy much of the land areas, but will have efficiency of many propeller type plants because it uses wide blades and strong wind on higher elevations, have a big torque for every of turbines and can utilize powerful electrical generators.

Since rotors are located deep inside of the plant and working blades are open only less than 90 degrees of front surface of the rotor, the noise, produced by the turbines, will be muffled. The bird population will be well protected since the birds cannot get inside the turbines and to the rotors.

4) Description of Embodiment Number 2 (FIG. 10)

FIG. 10 shows a power plant designated to number 200 with another possible arrangement of turbines 202, with horizontal axis of rotation and design similar to design of turbines in embodiment Number 1. A plurality of turbines is mounted between three towers 203, rotatable on horizontal platform 204 relative to base 205. Operation of this power plant is similar to operation of power plant of embodiment N1.

5) Description of Embodiment Number 3 (FIG. 11)

FIG. 11 shows one more arrangement of turbines, this time with vertical axis of rotation of rotors. The power plant generally designates to number 300. Design of turbines 302 should be modified compared to design of embodiment N1 by changing of bearings. Support for the turbines 302 will be provided by roof 301, floors 304 and 305, towers 303 will form the housing; Base 306 is providing positioning toward the wind. Operation of this embodiment of power plant is also similar to operation of embodiment N1.

6) Description of Embodiment Number 4 (FIG. 12)

FIG. 12 shows possible design of a blade for a rotor. The tube 401 is similar to tube 86 in embodiment N1. A plurality of frameworks 402 is fixed to central tube 401 and evenly distributed along the tube and around it. Blades 403 and 404 are fixed to the frameworks from both sides of the frameworks with an air gap 408 between the edges 409 and 410 and the tube 401. If blades together with frameworks will be rigid enough, they can be fixed to side disks (not shown), and the central tube will be not needed. The operation of the power plant is similar to operation of embodiment N1.

7) Description of Embodiment Number 5 (FIGS. 13 through 17)

Referring to the drawings, a wind power plant, embodiment N5 is indicated generally at number 510 in FIG. 13. Support base 512 is firmly mounted on a concrete frame 513 with heavy filling on a solid ground. A housing of cylindrical shape is indicated generally as number 515 and is built on the base 512. A plurality of floors 516 and a roof 517, made in shape of disks of equal diameter of cylindrical surface, are disposed one above another on walls 518. The walls 518 are made in a shape of equal height and diameter cylinders with outer diameter less than the diameter of the floors and roof. The floors 516, roof 517, walls 518 are made of enforced concrete, capable to withstand the vibration of working power plant. The floors 516, and roof 517 are extended outward of the walls 518, while walls 518 are keeping the floors 516 one above another and forming a plurality of circular shaped balconies 519 around the housing, concentric with vertical axis 520 while upper floors 516 provide ceilings 519A for the lower balcony and floor for the balcony 519B (see FIG. 16). The walls, floors, roof and balconies are mounted concentrically around common vertical axis 520.

Ring shaped vertical rails 521B fixed inside the balconies to the walls 518, and horizontal circular rails 521A are forming first setting of rails for riding the carriages 530. Second setting of railings 522 and third setting of railings 523 are combined together and fixed to the floors and to the ceilings of the balconies opposite to each other closer to cylindrical surfaces of the floors and the ceilings. Each of the settings has a circular shape and surrounds each of the balconies concentric with vertical axis of the housing 519. Each of the settings has vertical and horizontal surfaces and differs only in dimension of their diameters.

A cluster of turbines, or, as we can name it, a plurality of turbines, is placed inside of the balconies around the housing 515, one turbine for each one balcony. A turbine is generally indicated at number 528. A plurality of carriages 530, pivotally connected with each other by hinges 532 (see FIGS. 14 and 15) in a way that they are forming a complete ring, mounted on first setting of rails 521 with possibility to ride on horizontal wheels 534 and bearing boxes 536. The design of these bearing boxes is the same as in embodiment number 1 (See FIG. 7). Bearing boxes 536 are carrying the weight of the carriages 230 and limit vertical movements while horizontal wheels 234 support the movement of carriages around vertical axis 520.

Light frames 538, made of tubes, are pivotally mounted to carriages 530 by connectors 540 and tightened with bracing cables 544 to carriages and with cables 542 between frames of neighboring carriages, forming a common rigid ring of carriages, which we can name a rotor 545 of a turbine 528.

Big and wide blades 546, made of thin sheet metal or another rigid strong material like enforced plastic, are mounted on the frames 538. The tolerance between the wheels 534 and the riding surface of the rails 521B can be controlled via levers 548 and bolts 550.

A rotatable part of electrical generator, permanent or electrical magnets 560 (see FIGS. 15 and 16), are mounted on the lower side of carriages 530 with a small air gap 561 with coils 562, mounted on the floor 516 at the same radius from the axis 519 circumferentially opposite to the magnets. A conductor system is mounted inside the housing 515 (not shown). A speed control sensor 565 (FIG. 16) is mounted on a wall 518 opposite to an actuator 566, mounted on one of the carriages 530. Doors 568 (see FIG. 16) in the walls 518 are allowing performing surveillance and maintenance of the equipment.

On FIG. 14 we can see in cross section stabilizer, generally indicated as number 570. Stabilizer 570 is mounted rotatable around balcony 519, one stabilizer for each balcony, on second setting of rails 522 (see FIGS. 16 and 17) and has a plurality of bearing blocks 572 similar to bearing block of embodiment N1 and horizontal wheels 574 attached to upper ring 570A and lower ring 570B of equal diameter, disposed inside of the balcony close correspondingly to the ceiling 519A and floor 519B of the balcony 519. A wind deflector 570C is fixed to the rings 570A and 570B from the right side of the balcony. Wind deflector 570C is having a J-shape-with front bended part 570C1 made as a 90 degrees arc surface with front cutting edge 670C2 disposed parallel to vertical axis 520 and in a vertical plane, crossing vertical axis 520. The tail straight part 570C3 of wind deflector is disposed in a vertical plane and outstretched behind this vertical axis and behind back side of the balcony 519, exposing the right outer surface to impact of the wind from the right side of the balcony 519 and inner surface disposed to the flow of the air passing through the balcony 519.

A wind accelerator 570D is mounted on the same upper ring 570A and lower ring 570B, from the left side of the vertical axis 520 and disposed in vertical planes with front part 570D2 located in front side of the balcony and longer back tail side 570D3 outstretched behind back side of the balcony 519. The outer left vertical surface of the accelerator 570D is exposed to the impact of the wind from the left side of the balcony 519, while inner vertical surface is disposed to the flow of the air, passing through the balcony 519. Wind tail is indicated as number 570E, and is created by tail part of accelerator 570D3, tail part of deflector 570C3, tail roof 570E1, and tail floor 570E1 together and forming a rectangular air concourse between their inner surfaces while tail floor 570E1 is disposed opposite to the floor 519B of the balcony 519 and the tail roof 570E1 is disposed opposite to the ceiling 519A. Tail floor 570E1 and tail roof 570E1 are identical, and have a trimmed front cutting edge 570E3 for allowing the stabilizer 570 to rotate around balcony 519. Inner tail walls 570E2 are fixed inside the air concourse between the tail floors and tail roofs 570E1 and outstretched back from back side of the balcony 519, dividing the air concourse into tunnels 570E4 for creating tunnel suction for the flow of the air, exiting of the balcony 519. Walls 570E2 are angled from back side of the housing to the side of deflector, following the direction of the air, exiting the blades. It allows to diminish eddies of the air and increases the length of the tunnels 540E4 and the tunnel suction inside thereof. The last to the right wall 570E5 ends before it meets with the tail part of wind deflector 570C3, leaving an opening 570E6 for the remains of the air between these walls. Front side of accelerator 570D2 has additional small bended part 570D4 for increasing the entrance 570F for the wind. Struts 570DS are adding rigid ness between the rings 570A, 570B and accelerator 570D. Front cutting edge of deflector 570C2 and front part of accelerator 570D are forming an entrance 570F for the flow of the wind from the left side of the axis 520 to the balcony 519.

On FIG. 14 we can also see inner areas of the housing 575, which can be used as storages, garage and place for shaft 576 with elevators 578, capable for lifting cars and heavy cargo, and stairs 579. We also can see in cross section governor 580 and cutting edge of the governor 580A. Governor 580 is having a shape of an arc surface, cut along longitudinal axis with two perpendicular planes crossing through axis of said arc while this axis is coincided with vertical axis 520. The diameter of the arc surface of governor 580 is slightly less than diameter of bended part of deflector 570C1, but bigger than diameter of rotor 545, allowing the governor 580 to ride on the bearing boxes 572 on third setting of rails 523 behind the deflector 570C with possibility to cover from the wind the remaining part of the open surface of the balcony in the entrance 570F.

Power drive 582 with two shafts 583 and two gear wheels 584, (see FIG. 17), is installed on the surface of the bended front part of deflector 570C1, and gear wheels 584 are engaged through windows in the surface of deflector with two gear tracks 586, fixed to the surface of governor 580. This engagement is similar to one described in embodiment N1 (see FIG. 7). Cutting edge 580A of governor 580 is shown on FIG. 14 disposed slightly to the left of cutting edge of deflector 570C2, partially covering the entrance 570F between cutting edge 570C2 and front part of accelerator 570D2. The movement of the governor will be controlled via computer (not shown) and will be discussed later.

On FIG. 16 we can see cross section along vertical axis through the balcony 519 from the left side through one of the carriages 530 and through wind accelerator 570D2 and an upper ring 570A and lower ring 570B. Horizontal wheels 534 and 574 of the carriages, stabilizer and governor are contacting with vertical surfaces of rails of setting 521, 522, 523, what keeps all this moving parts around vertical axis 520, while bearing boxes 536 and 572 are limiting their vertical movements.

On FIG. 17 we can see deflector 570C1, governor 580 and upper ring 570A and lower ring 570B.

8) Operation of the Power Plant of Embodiment Number 5

This power plant is designated for producing electrical power even on a greater scale than the first embodiment, with bigger horizontal dimensions. The operation of this embodiment in general is similar to operation of the first embodiment.

As we can see on FIG. 14, each of turbines 528 mounted on each of balconies 519 is oriented by its own stabilizer 570 toward direction of the wind, generally indicated as number 590. The impact o the wind 590 onto outer vertical surface of accelerator 570D3 and deflector 570C3 keeps the front cutting edge of deflector 570C2 in vertical plane, crossing the axis of rotation 520 and parallel to general direction of the wind 590. The wind 590, blowing in the entrance 570F between the cutting edge 570C2 and accelerator 570D2 will push the blades 546 of the rotor 545, positioned from the left side of the axis 520 clockwise, since the blades 546 located from the right side of the axis 520 are shielded from the wind by the bended part of wind deflector 570C1.

The governor 580 is shown on FIG. 14 with its cutting edge 580A slightly shifted to the left side of cutting edge of deflector 570C2 but the governor can hide completely behind the bended part of deflector 570C1, so, it will not influence on he work of turbine 520. The rotor 545 in this case will rotate on full speed for the existing speed of the wind 590, while the entrance of stabilizer 570 is constantly keeping 90 degrees of cylindrical surface of the balcony 519 from the left side of the axis 519 opened to the flow of the wind. If the wind 590 changes direction, it will impact on the tail outer vertical planes of stabilizer 570, forcing it to turn to a new direction once again with cutting edge 570C2 positioned in a plane crossing the axis of rotation arid parallel to new direction of the wind. When the stabilizer is turning into a new position, the gear wheels 584, engaged with gear tracks 586, will pull the governor 580 so that location of the governor 580 relative to stabilizer 570 will not change and, if the speed of the wind remains the same, the speed of rotation of the rotor 545 will not change. Computer (not shown and can be located far away from the power plant) is constantly monitoring the time between the signals, received from all of the speed control sensors 565 from all of the turbines 528 with every revolution of the actuators 566. If the time for one or several of turbines 528 is becoming too short, it means, that the speed of rotation of this rotors 545 is too high, and computer will send signals to activate the power drive 582, which via shafts 583 rotate gear wheels 584, moving gear tracks 586 and, consequently, governor 580 clockwise on FIG. 14 further to the left of cutting edge of deflector 570C2 so that it will partially cover the entrance to the flow of the wind, diminishing its impact on the blades 546 and diminishing the speed of rotation of the rotor 545. If the wind became lighter, the computer will analyze the signals from sensor 565 and send command to rotate the governor 580 back, anti-clockwise, increasing the entrance to the wind and the speed of rotation of rotor 545.

Computer will constantly monitor the speed of rotation of all of the rotors 545 and maintaining it at one chosen level, moving the governors 580 in evaluated position because it is necessary for keeping the standard quality of electrical power. This task is impossible to perform without operating via computer and it was not implemented in previous inventions. Another task for the computer is to constantly compare the speed of all of the rotors 545, not allowing for two or more of them to have the same speed, avoiding synchronous speeds of rotors 545.

Another possibility in this power plant is to decrease or increase the amount of working turbines via computer by turning them on or shutting them down during the time of a day when we have changing demands for electrical power. All of the turbines can be closed down via computer in case of emergency, heavy snow, very high wind or for maintenance. In this case the governor covers completely the entrance to the wind, all of the working surfaces of turbines will be covered, what increases the safety of the plant.

The inner areas of the housing 575 can be used as storages and garages and for installing electrical equipment of the power plant. Elevators 578 can lift the cars and other heavy load between the floors 516, and stairs 579 are providing additional measures for maintenance of the plant and for safety.

Electrical power in proposed embodiment of power plant is produced via movement of permanent or electrical magnets 560, fixed to carriages 530, relative to coils 562, mounted on the floors 516 with an air gap 561 between the coils and the magnets inducing electrical current in coils. The dimensions of this gap will be defined as tolerance for movement of rotor 545 and can be maintained by bolts 550, turning levers 548. The electrical current, induced in the coils, will be collected by conductor system, mounted to the hosing 515.

The efficiency of this power plant is increased by implementing the wind tail 570E, which is working in two ways: the outer surfaces of accelerator 570D3 and deflector 570C3 are used as means for keeping the entrance of the stabilizer 570F toward direction of the wind 590 while inner surfaces of tail wind 570E are creating suction inside the tunnels 570E4, increasing the flow of the wind to the blades 546 of rotors 545.

By positioning the turbines one upon another, we are using several turbines, occupying smaller areas of land and utilizing higher speed of the wind on higher elevations. It is even more important if we will build this plant on coastal areas closer to the ocean where the wind is stronger and seldom changes direction (but the cost of the land is much higher). Since with higher elevation the wind is higher, the turbines, located on the upper levels will receive stronger wind and rotate with higher speed than lower turbines, which also can help to avoid synchronous rotation of rotors. While coastal areas of the oceans are highly populated, it is important that suggested plants are having good aesthetic view and not looking anything like an industrial building but instead capturing the aura of a skyscraper or even a landmark for this area where everyone can determine the direction of the wind by simply looking at the location of the wind tail of the plant. Since the turbines are located inside the housing and almost completely covered, the noise of the rotors will be muffled and the bird population will not be damaged.

The plant of embodiment number 5 will be working better with bigger diameters of turbines (for example, bigger than 2,000 feet). The bigger will be the diameter of the rotors, the bigger will be the output of electric energy while the angular speed of rotation will decrease and the size of the carriages and the blades can remain the same.

The proposed embodiments of power plants can provide an important solution to the problem of receiving electrical energy while not hurting the environment and providing necessary safety measures. It can be built a whole range of power plants from a smaller scale, having one or several turbines, to large-scale power plants, having 20 or 30 turbines. Small power plant with a singular turbine can be built for a singular home and can be controlled by a built-in microprocessor.

The price of building a big power plant with many turbines with big diameter located on high elevation can be high but it will be many times cheaper than building, for example a nuclear power plant or even a coal burning power plant and it will not cause any harm to the environment, not now and not in the future, especially if we will take a look at Chernobyl and the cost that should be paid for many years to come.

The price of the power plant of embodiment N5 will be significantly reduced by using the inner areas of the housing as places for storages and garages.

Various modifications, additions and changes can be made in all embodiments of proposed power plants without departure from the spirit and scope of this invention. For example, by installing guide and supportive magnets instead of wheels and rails as riding means for rotors in embodiment number 5, we can improve efficiency of the plant. Power for the magnets we can receive from the plant itself, while for the starting time we can install batteries.

Another possibility, for example, is to make in embodiment number 1 the front deflector and governor in a shape of a straight plane, parallel to the front side of the housing, dispose the governor of one turbine ahead of the deflector of the lower turbine. In this case even small movement of governor will have great effect on the speed of the turbine, because the governor will begin to cover the blades of the rotor, perpendicular to the flow of the wind, having the biggest torque, and it will make easier the work of the power drive.

Another possible design, for example, will be change of the design of the power drive for moving the governor by using instead of gear and gear track frictional engagement between wheels, covered with tires, and frictional tracks, attached to governor.

What I claim as my invention is:

1. A wind power plant, comprising:
   (a) a base;
   (b) a housing, mounted on said base rotatably around a vertical axis: said housing further characterized as having a front side and a back side with said front side facing a general direction of the wind; said housing further characterized as comprising a lower platform, supportive towers, installed on said platform, and a roof connecting said towers and forming air concourses between said roof, said towers, and said lower platform for receiving the wind from said front side and exiting said wind from said back side;
   (c) means for positioning said housing towards the general direction of the wind and for producing tunnel suction for said wind, comprising a wind tail; said wind tail further characterized as having a front side and a back side; said wind tail comprising:
   outer tail wails, attached to said back side of the housing and outstretched back from said back side of the housing;
   a tail roof and tail floors, connecting said outer tail walls and outstretched back from said back side of the housing;
   inner walls, connecting said tail roof and tail floors and outstretched back from said back side of the housing;
   tail tunnels, created between said roof, said floors, and said walls, having entrances for the wind, exiling said back side of the housing, and exits for said wind from the back side of the wind tail;

(d) a plurality of wind turbines, mounted one above another in said air concourses between said towers; each of said turbines comprising:
  a rotor having a front side disposed towards said front side of the housing and an axis of rotation parallel to said front side of the housing; said rotor equipped with blades and side disks positioned opposite each other along said axis of rotation of said rotor from both sides of said blades;
  a front wind deflector, stationarily attached to said housing, shaped as a shield for covering from the wind a part of said front side of said rotor to one side of the axis of rotation while leaving opened to the wind the remaining front side of said rotor; said deflector further characterized as having a front cutting edge and a back cutting edge;
  a governor, moveably attached to said housing, shaped as a shield for changeably covering from the wind said remaining front side of said rotor;
  a power drive, connected to said governor for moving thereof relative to said front wind deflector;
  a back deflector, stationarily attached to said housing and said back cutting edge of said front deflector, shaped as a plane, dividing the wind between the neighboring turbines; said back deflector further characterized as outstretched back towards said back side of the housing and connecting said floors of said tail tunnels.

2. The wind power plant of claim 1 further characterized as having additional means for positioning said housing around said vertical axis on said base in alignment with the general direction of the wind, comprising:
  (a) a system of positional sensors, mounted on said housing, arranged at one radius around said vertical axis, each of said sensors indicating a different angle between said front side of the housing and the general direction of the wind;
  (b) a weather vane, mounted rotatably around said vertical axis on said housing, said weather vane having an arm;
  (c) an actuator, attached to said arm to activate said sensors while turning above them by impact of the wind on said weather vane;
  (d) a servomotor, having an engagement between said housing and said base, for rotating said housing relative to said base.

3. The wind power plant of claim 1 wherein said rotor comprising a system of connected together light frameworks disposed between said side disks and evenly distributed around said axis of rotation of said rotor supporting said blades and forming together with said side disks and said blades a rigid and balanced unit.

4. The wind power plant of claim 1 further characterized as having means for controlling the work of the power plant, comprising:
  (a) a plurality of speed control sensors, attached to said housing, one sensor for each of said turbines;
  (b) a plurality of actuators, attached to said rotors, one actuator for each one rotor, for activating said sensor with every revolution of said rotor;
  (c) a computer, installed for:
    evaluating the time between the signals from each of said speed control sensors, installed on each of said turbines; keeping this time at one chosen level for each of said turbines, despite of changes of speed of the wind, by sending signals to said power drive to move said governor;
    comparing the speed of each of said rotors, and in case of equal speed of some of the rotors, making said speed different, avoiding synchronous rotations;
    stopping the work of some of said turbines while keeping the work of other turbines;
    stopping the work of all of the turbines and covering completely the front side of the housing in case of heavy snow, a strong storm, for maintenance, and in case of reduced demand for electrical energy;
    returning said turbines back to work.

5. The wind power plant of claim 1, further characterized as having means for converting the power of the wind into electrical power, comprising:
  (a) rotatable parts, comprising magnets, attached to said side disks of the rotors from both sides thereon and evenly distributed at the same radius around said axes of rotation of the rotors and close to said axes;
  (b) stationary parts, comprising coils, evenly distributed opposite to said magnets and mounted on said housing around said axes of rotation of the rotors from both sides of said rotors;
  (c) an air gap between said magnets and said coils;
  (d) a conductor system, mounted inside said housing from both sides of said rotors.

6. The wind power plant of claim 1, wherein said front deflector from each one of said plurality of turbines deflects the wind in the direction of the rotor of the neighboring turbine, thereby increasing the impact of the wind on said rotor.

7. The wind power plant of claim 1, wherein said tail floors of said wind tail are bent in an upper direction near said entrances of said tail tunnels and in a lower direction near to said exits of said tail tunnels.

8. The wind power plant of claim 1, further characterized as comprising a crane and shafts with elevators and stairs for safety measures, maintenance and overhaul.

9. The wind power plant of claim 1, further characterized as comprising front and back bird protective nets, fixed correspondingly to said front side of the housing and said back side of said wind tail.

10. A wind power plant, comprising:
  (a) a base;
  (b) a housing, mounted on said base rotatably around a vertical axis; said housing further characterized as having a front side and a back side with said front side facing a general direction of a wind; said housing further characterized as comprising a lower platform, supportive towers, installed on said platform, and a roof, connecting said towers and forming air concourses between said roof, said towers and said lower platform for receiving the wind from said front side and exiting the wind from said back side with the general direction of the wind perpendicular to said front side;
  (c) means for positioning said housing towards the general direction of the wind and for producing tunnel suction for said wind, comprising a wind tail; said wind tail further characterized as having a front side and a back side; said wind tail comprising:
    outer tail walls, attached to said back side of the housing and outstretched back from said back side of the housing;
    a tail roof and tail floors, connecting said outer tail walls and outstretched back from said back side of the housing;
    inner walls, connecting said tail roof and tail floors and outstretched back from said back side of the housing;

tail tunnels, created between said roof, said floors, and said walls, having entrances for the wind, exiting said back side of the housing, and exits for said wind from the back side of the wind tail;

(d) a plurality of wind turbines, mounted above one another in said air concourses between said towers; each of said turbines comprising:

a rotor equipped with wide blades, having a front side, disposed towards said front side of the housing and having an axis of rotation parallel thereto; said rotor further characterized as having side disk opposite to each other along said axis;

a front wind deflector, stationary attached to said housing, shaped as a shield for covering from the wind said front side of said rotor from one side of said axis of rotation while leaving opened to the wind the remaining front side from another side of the axis; said deflector further characterized as having a front cutting edge and a back cutting edge with said front cutting edge disposed in a plane parallel to the general direction of the wind and crossing said axis of rotation of the rotor;

a governor, moveably attached to said housing, shaped as a shield for changeably covering from the wind part of said remaining front side of said rotor;

a power drive, connected to said governor for moving thereof relative to said front wind deflector;

a back deflector, stationarily attached to said housing and said back cutting edge of said front deflector, shaped as a plane dividing the wind between the neighboring turbines; said deflector further characterized as outstretched back towards said back side of the housing and connecting said floors of said tunnels.

11. The wind power plant of claim 10, further characterized as having means for controlling the work of the power plant, comprising:

(a) a plurality of speed control sensors, attached to said housing, one sensor for each of said turbines;

(b) a plurality of actuators, attached to said rotors, one actuator for each one rotor, for activating said sensor with every revolution of said rotor;

(c) a computer, installed for:

evaluating the time between the signals from each of said speed control sensors, installed on each of said turbines; keeping this time at one chosen level for each of said turbines despite of changes of speed of the wind by sending signals to said power drive to move said governor;

comparing the speed of each of said rotors, and in case of equal speed of some of the rotors, making said speed different, avoiding synchronous rotations;

stopping the work of some of said turbines while keeping the work of other turbines;

stopping the work of all of the turbines and covering completely the front side of the housing in case of heavy snow, a strong storm, for maintenance, and in case of reduced demand for electrical energy;

returning said turbines back to work.

12. The wind power plant of claim 11, further characterized as having additional means for positioning said housing around said vertical axis an said base in alignment with the general direction of the wind, comprising:

(a) a servomotor, having an engagement between said housing and said base, for rotating said housing relative to said base; said servomotor further characterized as connected with said computer and operated after receiving commands from said computer;

(b) a system of positional sensors, attached to said housing and arranged at one radius around said vertical axis, each of said sensors indicating a different angle between said front side of the housing and the general direction of the wind; said system of positional sensors further characterized as connected to said computer;

(c) a weather vane, having an arm and an actuator, attached to said arm and activating said positional sensors while turning above them by the impact of the wind.

13. The wind power plant of claim 11, further characterized as having means for converting the energy of the wind into electrical energy; said means comprising:

(a) rotatable parts comprising magnets, attached to said side disks of the rotors from both sides thereof and evenly distributed at the same radius around said axes of rotation of the rotors and close to said axes;

(b) stationary parts comprising coils, evenly distributed opposite to said magnets and mounted on said housing with an air gap between said magnets and said coils from both sides of said rotors around said axes of rotation of the rotors;

(c) a conductor system, mounted inside said housing from both sides of said rotors.

14. The wind power plant of claim 11, further characterized as comprising front and back bird protective nets, fixed correspondingly to said front side of the housing and said back side of the wind tail.

* * * * *